US012320011B2

(12) United States Patent
Lingnau et al.

(10) Patent No.: US 12,320,011 B2
(45) Date of Patent: *Jun. 3, 2025

(54) VITREOUS COATING APPLICATION BY INDUCTION HEATING AND INTEGRATION WITH INDUCTION KINETIC WELD JOINING

(71) Applicant: AmpClad Coating Technologies Inc., Edmonton (CA)

(72) Inventors: David Grant Lingnau, Calgary (CA); Jeff Cochrane, Leduc (CA)

(73) Assignee: AmpClad Coating Technologies Inc., Edmonton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,249

(22) Filed: Oct. 3, 2023

(65) Prior Publication Data

US 2024/0026547 A1 Jan. 25, 2024

Related U.S. Application Data

(63) Continuation of application No. 17/092,199, filed on Nov. 6, 2020, now Pat. No. 11,773,495.

(Continued)

(51) Int. Cl.
*C23D 5/04* (2006.01)
*C23C 4/02* (2006.01)
(Continued)

(52) U.S. Cl.
CPC ............... *C23D 5/04* (2013.01); *C23C 4/02* (2013.01); *C23C 4/04* (2013.01); *C23C 4/129* (2016.01);
(Continued)

(58) Field of Classification Search
None
See application file for complete search history.

(56) References Cited

U.S. PATENT DOCUMENTS 2,848,566 A * 8/1958 Limpel .................... C23D 9/06
219/609
2,927,869 A * 3/1960 Hortvet ................... C03C 27/04
427/591

(Continued)

FOREIGN PATENT DOCUMENTS

AU 2014290613 A1 1/2016
CA 2918333 A1 1/2015
(Continued)

*Primary Examiner* — Jose I Hernandez-Kenney
(74) *Attorney, Agent, or Firm* — Amburn Law PLLC; Dean W. Amburn

(57) ABSTRACT

Induction heating facilitated coating systems and processes for pipes overcome corrosion and erosion of the pipes at extreme temperatures and pressures in applications including oil and gas downhole tubulars and pipelines as well as processing facilities. Being based on vitreous fused inorganic compounds, the present invention achieves very high corrosion resistance at remarkably modest cost. Attractive economics and immunity to chlorides and moisture permeation at extreme concentrations and temperatures also make it well suited to desalination plants and potable water piping applications. Due to its extreme temperature resistance, it also is very well suited for geothermal wells. Additionally, due to its characteristic smooth durable surface, the present invention is ideally suited for applications involving the opposite of corrosion, namely scaling problems, such as fouling in sewage systems and scale buildup in heavy oil wells.

4 Claims, 17 Drawing Sheets

Related U.S. Application Data

(60) Provisional application No. 62/931,259, filed on Nov. 6, 2019.

(51) Int. Cl.

| | | |
|---|---|---|
| *C23C 4/04* | (2006.01) | |
| *C23C 4/129* | (2016.01) | |
| *C23C 4/16* | (2016.01) | |
| *C23C 4/18* | (2006.01) | |
| *C23D 3/00* | (2006.01) | |
| *C23D 5/00* | (2006.01) | |
| *C23D 15/00* | (2006.01) | |
| *H05B 6/10* | (2006.01) | |
| *H05B 6/14* | (2006.01) | |
| *H05B 6/36* | (2006.01) | |
| *H05B 6/42* | (2006.01) | |
| *H05B 6/44* | (2006.01) | |
| *B05D 1/12* | (2006.01) | |
| *B05D 3/02* | (2006.01) | |
| *B05D 7/22* | (2006.01) | |
| *F16L 58/14* | (2006.01) | |

(52) U.S. Cl.
CPC ............... *C23C 4/16* (2013.01); *C23C 4/18* (2013.01); *C23D 3/00* (2013.01); *C23D 5/005* (2013.01); *C23D 15/00* (2013.01); *H05B 6/10* (2013.01); *H05B 6/104* (2013.01); *H05B 6/14* (2013.01); *H05B 6/36* (2013.01); *H05B 6/42* (2013.01); *H05B 6/44* (2013.01); *B05D 1/12* (2013.01); *B05D 3/0245* (2013.01); *B05D 7/222* (2013.01); *B05D 2202/10* (2013.01); *F16L 58/14* (2013.01)

(56) References Cited

U.S. PATENT DOCUMENTS

| | | | | |
|---|---|---|---|---|
| 3,291,631 | A | * | 12/1966 | Smith ............... B05B 14/10 427/195 |
| 3,432,326 | A | * | 3/1969 | Lemelson ............ B05D 1/24 427/195 |
| 3,484,266 | A | | 12/1969 | Nelson |
| 3,546,909 | A | | 12/1970 | Gartrell |
| 3,574,584 | A | * | 4/1971 | Girard et al. ........... C23D 5/04 65/32.4 |
| 4,490,411 | A | * | 12/1984 | Feder ............... C23C 24/10 427/233 |
| 5,618,591 | A | * | 4/1997 | Bernstein, Jr. ......... H05B 6/105 427/544 |
| 6,637,642 | B1 | | 10/2003 | Lingnau |
| 9,675,999 | B1 | | 6/2017 | Lakeman et al. |
| 10,774,006 | B2 | | 9/2020 | Gangakhedkar et al. |
| 2009/0098289 | A1 | * | 4/2009 | Deininger .......... C23C 18/1225 427/236 |
| 2016/0194764 | A1 | * | 7/2016 | Patel ................ C23D 5/00 427/591 |

FOREIGN PATENT DOCUMENTS

| | | | | |
|---|---|---|---|---|
| CN | 104373702 | A | | 2/2015 |
| CN | 105392923 | A | | 3/2016 |
| CN | 106746660 | A | | 5/2017 |
| CN | 110124957 | A | * | 8/2019 ............ B05C 11/08 |
| EP | 3022332 | A | | 7/2017 |
| GB | 1061818 | A | | 3/1967 |
| JP | 2016527399 | A | | 9/2016 |
| KR | 20160039214 | A | | 4/2016 |
| KR | 101740706 | B1 | | 5/2017 |
| KR | 20200102761 | A | | 9/2020 |
| WO | WO 2015009540 | A1 | | 1/2015 |
| WO | WO 2018131823 | A1 | | 7/2018 |

\* cited by examiner

VITREOUS COATING APPLICATION BY INDUCTION HEATING AND INTEGRATION WITH INDUCTION KINETIC WELD JOINING

RELATED APPLICATIONS

This application is a continuation patent application of U.S. Nonprovisional patent application Ser. No. 17/092,199, filed on Nov. 6, 2020, which claims priority to and the benefit of U.S. Provisional Patent Application No. 62/931,259, filed on Nov. 6, 2019, the entire contents of which are hereby incorporated by reference.

TECHNICAL FIELD

The invention generally relates to applying a corrosion resistant vitreous coating to the inside or outside of a pipe. More particularly the invention relates to applying a vitreous coating to the inside and/or outside of a pipe by induction heating and integration with induction kinetic welding together of more than one pipe where the area of the weld joining the pipes together is coated with the vitreous coating post welding.

BACKGROUND

According to the National Association of Corrosion Engineers ("NACE"), the 2018 total estimated annual cost of corrosion in just the oil and gas exploration and production industry within the United States is about $1.4 billion, broken down into $589 million in surface pipeline and facility costs, $463 million in downhole tubing expenses, and another $320 million in capital expenditures related to corrosion. It is widely recognized in the oil and gas industry that effective management of corrosion contributes towards achieving the critical benefits of statutory and corporate compliance with Health, Safety and Environmental Policy, reduction in leaks, increased plant availability, reduction in unplanned maintenance and reduction in deferment costs. The vast majority of these corrosion issues involve steel operating in environments against which it has insufficient natural resistance. Therefore, once corrosion problems of steel have been identified, the routine response is to upgrade steel's corrosion resistance with barrier coatings and/or cathodic protection or by alloying with sufficient chrome, nickel, molybdenum, cobalt, etc., to remain passive in each specific corrosive environment. These are expensive solutions, since corrosion resistant alloys can easily be an order of magnitude more expensive than ordinary steel. High performance coatings can cost as much as the steel they are supposed to protect, yet they often have a practical service life less than half that of the design life of the steel. Museums display glass-lined iron vessels dating back as far back as 300 years ago. For at least 60 years now, a complete assortment of glass-lined industrial components such as pipe spools, valves, elbows, tees, etc., have been in use in the chemical process industry. Here is indisputable proof that when it comes to extreme corrosion service such as strong acids or bases at high temperatures (e.g. 200° C.), glass linings are the ultimate solution, performing even better than super-exotic metals such as tantalum. In fact, the only metals which are more inert than glass in these conditions are the precious metals, gold, platinum and iridium. Conveniently, these decades worth of development and refinement by companies in the chemical process industry have generated large volumes of technical data proving commercial success with these inorganic glass linings.

Despite the long, successful history of glass linings in chemical factories, its use has never spread out into field applications such as pipelines and well casing and/or tubing strings for oil wells, gas wells and geothermal wells. On closer examination, there are mainly two key reasons why:
1. It is relatively easy build a chemical reactor with a glass lining at lower cost than one with a platinum lining. But they are still very expensive due to the slow labor-intensive processes required in their manufacture.
2. Historically the only way to connect joints of glass lined pipe together is with bolted flanges.

The present invention finally enables glass lined pipes and tubulars of unlimited length, which also are much less expensive than traditional glass lined reactors and piping of the same surface area. This makes glass linings affordable and practical for these field applications and industries previously considered unfeasible and/or unaffordable.

Following the dawn of the petrochemical industry about 80 years ago, came the mainstream and widespread introduction of plastics. For high performance coatings and linings, the most important of these were the phenolics, epoxies, nylon, polyurethanes, polyethylene, polypropylene, fluoropolymers and countless other variations, hybrids and derivatives. The first two in that list became the foundation of high-performance linings for immersion services such as in tanks, vessels, pipelines, etc. All of the materials in that list are classified as organic coatings because they rely upon the so-called "organic" chemistry of molecules with carbon "backbones." And for the vast majority, they are produced from oil or gas feedstocks, so the price of these materials is closely tied to the price of oil and/or gas.

For applications involving immersion service at temperatures less than 100° C. (for example crude oil or gas pipelines or produced water pipelines) there is a wide assortment of fusion bond epoxy ("FBE"), two component liquid epoxy or polyurethane linings, polyethylene sleeve liners, etc. These are all organic linings, made from petroleum feedstocks. The raw material cost for all of these organic materials is higher versus the inorganic ingredients in a superior performing vitreous lining. The chief ingredient for the present invention is $SiO_2$, otherwise known as beach sand, with the next ingredient being $Al_2O_3$ which is another abundant mineral. Small percentages of other inexpensive oxide minerals make up the remaining balance, to optimize the properties and performance. Therefore, the present invention can provide superior performing coatings at a very competitive cost compared to the traditional organic coatings used for immersion applications below 100° C.

For applications involving immersion service at temperatures up to about 200° C. there are only a few organic linings which can survive at this temperature. The best known are phenolic or phenolic-epoxy hybrid linings, which are much more expensive to install and are very thin and fragile. In these applications the present invention should have a large cost advantage over the traditional organic coatings used.

Additionally, there are many field applications which need to operate at temperatures up to and even substantially exceeding 300° C. and there are no organic coatings which can tolerate these temperatures. For example, SAGD wells, geothermal wells, deep sour gas wells.

There are three distinguishing characteristics between organic coatings versus inorganic vitreous coatings:
1. Organic coatings and linings virtually all rely on mechanical bonding and consequently are limited to adhesion strength less than 3,000 psi (often much lower). Vitreous coatings take advantage of chemical bonding to the steel, in addition to mechanical bonding and therefore, easily achieve in the range of 15,000 psi adhesion strength.

2. Organic coatings are permeable to water molecules, which is a big factor in the adhesion failure of such coatings. Vitreous coatings are impermeable to water—and even too much smaller molecules like hydrogen.

3. High temperature is a severe limitation of organic coatings. Service conditions approaching 100° C. are considered difficult. Upwards from there to 200° C. is very difficult and expensive to satisfy with organic coatings. Immersion service conditions above 200° C. are practically impossible for organic coatings. Vitreous coatings are capable of immersion service at temperatures over 400° C.

The other way to solve severe corrosion problems in pipeline applications is with Corrosion Resistant Alloys ("CRAs"). There is a spectrum of commercially useful CRAs starting with Duplex stainless steel being the least expensive and progressing up to highly alloyed materials like Inconel®, Hastelloy® C-276, etc. with commensurate high cost. Duplex pipe typically costs several times more than the same size of carbon steel pipe, while superalloys like Hastelloy® C-276 are typically at least an order of magnitude more expensive than carbon steel. At low chloride concentrations and carefully restricted temperatures, it is possible to obtain satisfactory service life with duplex stainless steel ("Duplex SS"). But in many field flowlines, especially offshore, the chloride concentration and/or hydrogen sulfide concentration is far beyond what Duplex will survive. Similarly, if the service temperature is high and chlorides are present, then only the superalloys are acceptable. In these offshore flowlines, organic coatings are considered completely inadequate.

Traditional glass lined vessels in the chemical processing industry use a very labor-intensive two-step process which requires cold spraying the prepared steel surface with an aqueous slurry containing suspended frit particles. This wet coat must be thoroughly dried before the next step. Once the coating is fully dried it is called a bisque and at this point, the entire vessel can be moved inside a large furnace for one to several hours at over 800° C. Part of the reason for the long duration is the practicality of uniformly heating a large mass of steel, but equally important, there is a chemical bond which must form between the coating and the steel. The traditional method to achieve this is to permit the substrate to oxidize a small amount under the bisque. As part of the advance preparation for this, it is common practice to formulate the frit with a small percentage of consumable elements such as nickel or cobalt which at the firing temperature are able to reduce the iron oxide back to the metallic state. During this sequence of oxidation and subsequent reduction at the interface between the steel and the bisque, the chemical bond is formed between the vitreous coating and the steel surface. While this is happening, it is typical for hydrogen to be released which must be allowed to egress through the bisque, otherwise it gets trapped within the coating and can cause spontaneous spalling of the vitrified coating, even after it is fully cooled. Therefore, the cooling process must be carefully timed and controlled. Owing to the long exposure to temperature well over the critical transformation temperature Ac1 for steel (typically about 725° C.), the resulting yield strength of the steel is very low. This is the wet-slurry, batch furnace process method of vitreous lining.

For the carefully engineered medium and high strength steels grades used in applications such as pipelines and downhole tubulars, this batch furnace process is technically and commercially incompatible. Typically these medium and high strength steel pipes and tubulars rely on either Quench and Temper ("Q&T") processes or Thermomechanical Controlled Process ("TMCP") both of which involve addition of hardening elements such as carbon, manganese, chromium and sometimes other micro-alloying elements such as niobium or vanadium. The strengthening mechanisms of Q&T and TMCP pipe would be negated in the long, hot firing cycle of the conventional batch furnace process—the steel would be reverted back to the annealed state. Additionally, the elevated level of carbon in these steel grades would be disruptive to the oxidation-reduction chemical reaction at the surface of the steel.

Even if it was practical to produce vitreous coated pipeline grade steel, there still remains the problem of how to join the individual pipes together. There is no known conventional arc welding process which would be compatible and practical for field welding of vitreous coated pipe joints. In the chemical process industry, the accepted solution is bolted connections such as flanges to make leak tight connections between discrete components which have already been vitreous lined. But for pipelines which may be hundreds or even thousands of kilometers long, it would be inconceivable to have bolted connections every 10 meters. Prior to the present invention, there was no practical method to weld precoated pipe joints.

SUMMARY

The invention has been developed to overcome corrosion and erosion at extreme temperatures and pressures in oil and gas downhole tubulars and pipelines as well as processing facilities, but unlike expensive alloying or coating solutions, the present invention achieves very high corrosion resistance at remarkably modest cost. Attractive economics and immunity to chlorides and moisture permeation at extreme concentrations and temperatures make it well suited to desalination plants and potable water piping applications. Due to its extreme temperature resistance, it also is very well suited for geothermal wells. Additionally, due to its characteristic smooth durable surface, the present invention is ideally suited for applications involving the opposite of corrosion, namely scaling problems, such as fouling in sewage systems and scale buildup in heavy oil wells.

By contrast to batch furnace processes for conventional glass lining of vessels and other discrete items, the present invention uses localized, traversing induction heating to rapidly heat the metal substrate from room temperature up to the firing temperature of the frit/bisque, typically in the range of 750° C. to 850° C. Due to the very high efficiency of energy transfer with induction heating, it is easy to raise the substrate temperature this amount in a matter of seconds and do so with very accurate control. Once the substrate is at the firing temperature, the frit/bisque goes into a molten state which can form the desired chemical bonding to the substrate and flow over the substrate to form a continuous uniform and uninterrupted vitreous coating on the substrate. Typically, the frit is formulated with a coefficient of thermal expansion which is less than that of the substrate so that once the vitrified coating cools below the glass transition temperature, it builds up a prescribed amount of compressive stress. It is well known that glass is strongest in compression as evidenced by the use of this design principle in items such as display screens for cell phones and tablet computers. The key difference is that with display screens, the interior region of the glass plate must be in tension to equalize the surface layer of glass which is in compression, whereas with vitreous coatings, essentially the entire thickness of the coating can be in compression with the balancing tensile counterbalance being provided entirely by the metal substrate.

Several variations of the present invention will be described below, but all of them begin with the same condition of the surface to be vitreous coated. For simplicity, it is illustrated that the surface to be coated is the inside of steel pipe or tube, although it is similarly possible to coat the outside of pipes and also flat surfaces. First there must be a visual and/or nondestructive examination ("NDE") inspection to identify and set aside pipe with damage such as dents or cracks. Next, the pipe must be cleaned on both the inner diameter ("ID") and the outer diameter ("OD") surfaces of any organic materials such as mill varnish, shellac, paint, grease, oil, etc. Sticky contaminants are best removed by steam cleaning and/or high-pressure water blasting. Any remaining hard organic contaminants and rust are best removed with abrasive blast cleaning, for example using steel grit/shot blast media, typically in a closed loop abrasive blasting system which purifies the steel grit/shot media in the recycling process. Alternatively, wet processes such as chemical cleaning with acid etching can provide the required surface preparation. Other more advanced methods of preparing the surface include laser ablation, plasma ablation, etc. Ideally the final prepared surface should have a roughness profile of about 50 to 80 microns and have a metal cleanliness of at least NACE—Level 2 ("NACE #2"), but ideally NACE—Level 1 ("NACE #1").

One of the many advantages of this invention is that the localized induction heating enables vitreous coating of Q&T and TMCP steels because the duration and even the depth of heating can be regulated in ways which preserve the strength properties of the steel. Available options for these methods of control include reverse side water quenching, high frequency induction heating to enable skin effect heating, fast travel speeds, multiple consecutive, highly focused induction coils, etc. The coils may be encircling the outside of the pipe or may be mounted on a stinger which runs inside of the pipe, provided the pipe is large enough diameter, typically greater than 100 mm inside diameter. For thin wall pipes (e.g. less than 6 mm wall), using low induction frequencies (e.g. below 10 kHz), it is practical to heat the pipe from the opposite side of the coated surface, whether that is the ID or the OD. For thick wall pipes (e.g. more than 10 mm wall), using medium induction frequencies (e.g. above 10 kHz), it is practical to heat the pipe on the same side as the coated surface, without raising the bulk thickness of the pipe above the lower transformation temperature, Ac1. Regardless of whether it is low frequency or medium frequency induction heating being used, the coating can be on the OD surface of the pipe, as would be desired for preventing external corrosion of buried pipe, or it can be on the ID surface for preventing internal corrosion from aggressive fluids. It is also possible using these methods to coat both the ID and the OD of the pipe.

Due to its speed, efficiency and spatial control, induction heating enables several important variations on the present invention:

Example 1: Two-Step Process of Wet Slurry Coating Followed by Induction Firing This method involves spray coating, dip coating or flood coating a pipe section with an aqueous slurry of frit and then drying the coating at a temperature below 100° C. to form a conventional bisque. Once fully dried, one or more induction coils are passed along the pipe to raise the coated surface to the firing temperature of the bisque which typically is in the range of 750° C. to 850° C. This may be done in the open atmosphere, or for specialized applications may be done under a controlled atmosphere of inert gas such as argon, nitrogen or carbon dioxide. There are several limitations with this two-step wet slurry process, for example, it requires up to several hours of drying at low temperature (typically below 50° C.) to remove the water carrier from the applied wet coating without blistering the bisque.

Example 2: One-Step Dry Process Using Fluidized Beds and Induction Firing

This method performs the coating and heating all in a single integrated step. The induction coil is located inside of a fluidized chamber containing dry powdered frit, the walls of which are the ID surface of the pipe which is moving relative to the induction coil. As the induction coil heats the adjacent ID ring of pipe up to the firing temperature, the floating frit particles fuse onto the hot, clean steel. Thickness of the resulting coating is regulated primarily by the temperature of the steel surface in combination with the time for which it is above the firing temperature. Secondary variables include the density of the fluidized bed in the chamber, the average particle size, etc. For coating the OD of pipes, the apparatus described above would be inverted with the fluidized bed and induction coil in annular arrangement around the outside of the pipe. This method may be done in the open atmosphere, or for specialized applications may be done under a controlled atmosphere of inert gas such as argon, nitrogen or carbon dioxide.

Example 3: One-Step Dry Process Using Electrostatic Sprayers and Induction Firing This method is very similar to Example 2 above, except that the fluidized bed is replaced with one or more electrostatic spray nozzles arranged in close proximity to one or more consecutive induction coils. In the simplest version, the induction coil and electrostatic sprayer are mounted on a stinger located inside of the pipe which is moved axially relative to the stinger. As the induction coil heats the adjacent ID ring of pipe up to the firing temperature, the electrostatically charged frit particles coming out of the spray nozzle(s) are attracted to the bare hot steel and fuse on contact. Thickness of the resulting coating is regulated primarily by the electrostatic potential difference between the steel and the nozzle and by the temperature of the steel surface in combination with the time for which it is above the firing temperature. As with the above examples, the design of this apparatus can be inverted to coat the OD surface of the pipe. This may be done in the open atmosphere, or for specialized applications may be done under a controlled atmosphere of inert gas such as argon, nitrogen or carbon dioxide.

Example 4: One-Step Dry Process Using Electrostatic Sprayers and Induction Kinetic Welding ("IKW") for Small Diameters This method is similar to Example 3 above, except that it provides a way of joining pipe which has previously been coated on the entire ID surface of the pipe body, thereafter simultaneously coating the ID surface of the weld while the opposing pipe ends are butt welded together using the Induction Kinetic Welding ("IKW") process. A rapid solid-state IKW welding method is known and previously taught in U.S. Pat. No. 6,637,642 (the '642 patent), utilizing induction heating of the pipe ends in a non-reactive atmosphere, to quickly raise the endfaces up to the hot working temperature, which then are kinetically welded in a single rapid action of a few seconds duration, joining the entire circumference, all in unison. The teachings of the '642 patent are incorporated herein as if repeated word for word.

In the simplest version, an electrostatic sprayer is mounted on a stinger located inside of one pipe just slightly back from the endface of the pipe being welded in the IKW process. The main difference from the previous examples is that the IKW process heats the endface of the mating pipes instead of the cylindrical ID or OD surface described above. Nonetheless, the IKW heats the steel substrate at the endface above the firing temperature creating a narrow ring-like hot zone onto which the electrostatically charged particles will immediately fuse upon contact. Timing of the dry frit spray is critical because it would contaminate the weld if any frit is discharged from the nozzle before the IKW process has reached the point at which the opposing pipe ends have come into contact with each other. Therefore, the ideal timing is to wait until the IKW process is approximately halfway through its kinetic phase and at that instant, begin the flow of electrostatic charged frit. For small diameters (e.g. 100 mm ID), a centralized electrostatic gun is preferred because the effective reach of the electrostatic gun is sufficient to generate the charged particle cloud in a roughly hemispherical shape of at least 100 mm diameter.

Similar to Example 3, the electrostatically charged frit particles coming out of the spray nozzle(s) are attracted to the thin ring of bare hot steel in the viscoplastic zone of the IKW and fuse on contact. Thickness of the resulting coating is regulated primarily by the electrostatic potential difference between the steel and the nozzle and by the temperature of the steel surface in combination with the time for which it is above the firing temperature. As with the above examples, the design of this apparatus can be inverted to coat the OD surface of the pipe. Due to the requirements of the IKW process, this method of coating the welds must be done in a protective atmosphere such as argon or nitrogen, to prevent oxide contamination of the weld.

Example 5: One-Step Dry Process Using Electrostatic Sprayers and Induction Kinetic Welding ("IKW") for Large Diameters This method is similar to Example 4 above, except instead of having the electrostatic gun located at the center axis of the pipe, one or more offset guns are used, the number of which is proportional to the circumference of the pipe. Also, it is preferred to utilize rotation between the pipe and the electrostatic gun(s) to ensure uniform coverage of the narrow circumferential hot zone described above.

Example 5a: One-Step Dry Process Using Fluidized Powder Sprayers Instead of Electrostatic Sprayers This method is very similar to Example 5 above except that it uses uncharged, dry particle spray from a fluidized powder medium.

Example 6

For localized and/or spot repair of coating on the ID of pipes, this example combines a single electrostatic gun with a close coupled, small diameter pancake style induction coil, in an angled head configuration to be able to reach inside of small diameter pipes.

Example 7

For localized and/or spot repair of coating on the OD of pipes or on flat plates such as along weld seams, or spot repairs on flat or convex surfaces, this example combines a single electrostatic gun with a close coupled, small diameter pancake style induction coil, preferably in a straight head configuration.

In all of the method variations described below, it is beneficial pre-process the frit by fusing all ingredients together and then pulverize to the final desired particle size, typically about 40-micron average size as the final, dry, ready-to-coat frit. This eliminates the possibility of constituent segregation during fluidization, metering and flow onto the metal substrate.

In all of the method variations described below, it is optimal to achieve a total coating thickness in the range of about 300 microns up to about 1500 microns. At less than 300 microns thickness, there is high risk of asperities on the substrate projecting through the coating resulting in holidays in the coating which would be prone to corrosion attack. Conversely, at large coating thickness, for example above about 1500 microns, there is high risk of spalling or cracking due to excessive cumulative compressive stress in the coating which result from the differential contraction between the steel and the coating during cooling from the firing temperature.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION

Example 1: Two-Step Wet Slurry+Induction Firing Process

Figure 1:
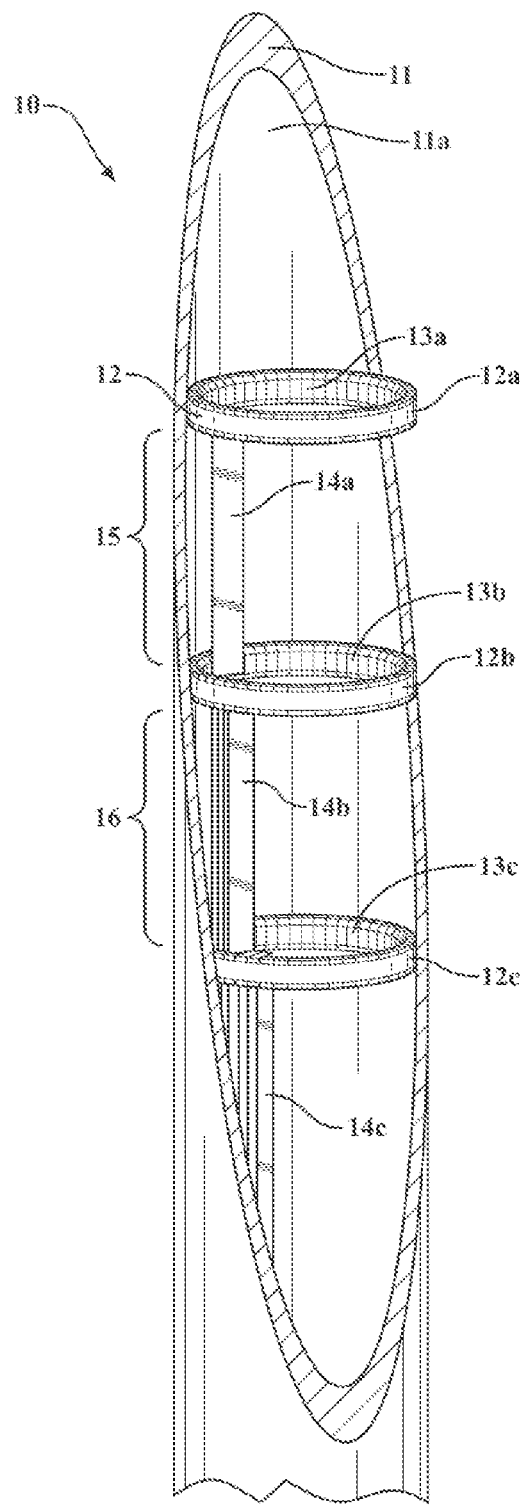
FIG. 1 is a schematic type drawing of a first embodiment of a Two-Step process of Wet Slurry coating the ID of a pipe, followed by Induction Firing.

Referring to FIG. 1, in a non-limiting embodiment of the invention, an induction coil enabled coating system 10 is illustrated in the environment of a partial cutaway of a pipe 11, showing a portion of the pipe inside surface 11a to be coated with a vitreous coating. The induction coil enabled coating system 10 includes an induction coil apparatus 12, having three circular coils 12a, 12b, 12c, in spaced apart formation. The coils are single turn induction coils of the type known to those of skill in the art. Each of the three coils 12a, 12b, 12c includes a U-shaped flux concentrator 13a, 13b, 13c. It should be appreciated that using two or more induction coils is within the scope of the invention. Induction busbars 14a, 14b, 14c connect the coils 12a, 12b, 12c in sequence leading to an induction power source and control system (now shown), the power source and control system being known to those of skill in the art.

Figure 12:
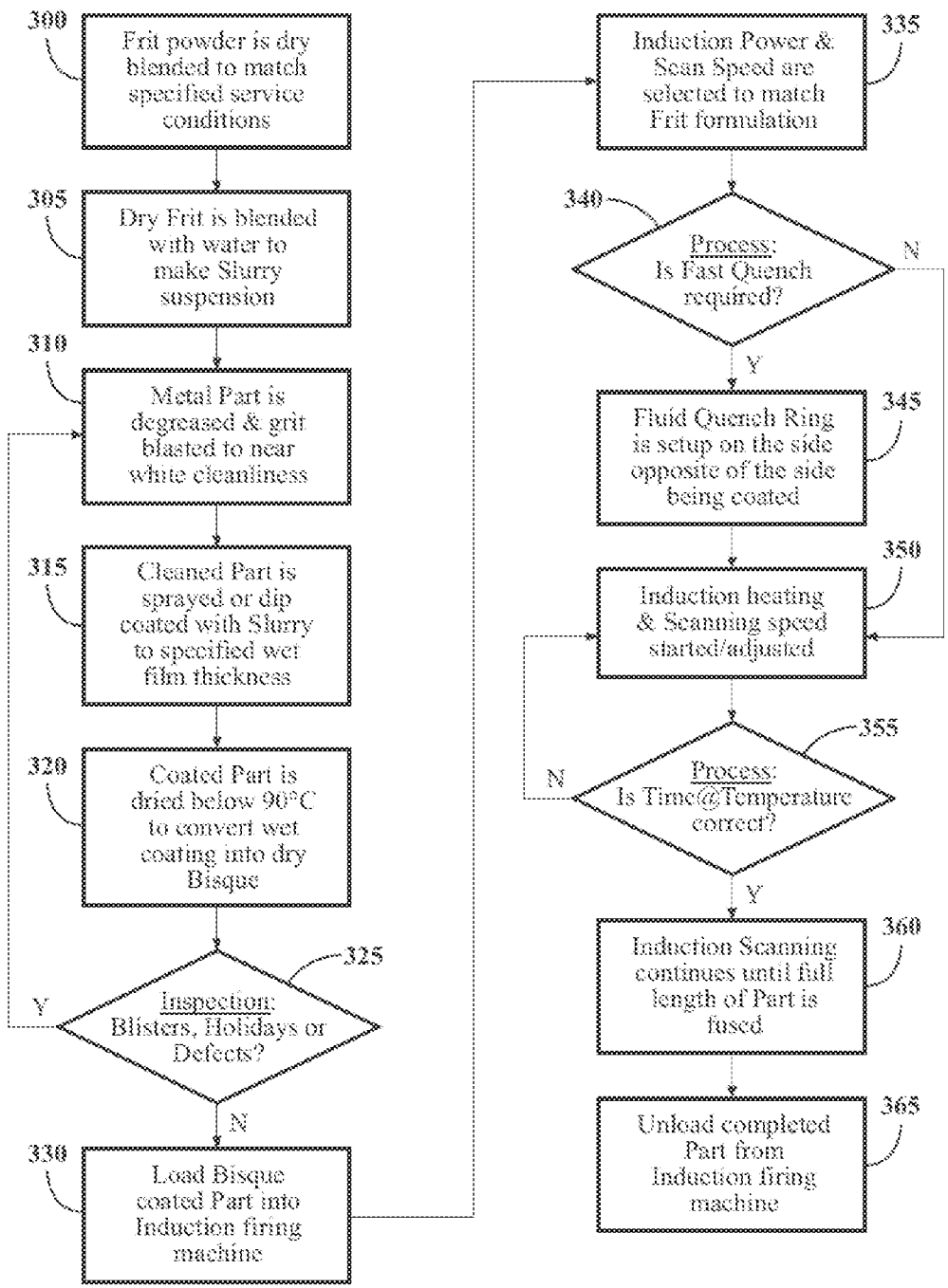
FIG. 12 is a flowchart type drawing showing a Two-Step Wet process of Slurry Coating followed hours later by Induction Fusing.

With added reference to FIG. 12, flowchart detailing the Two-Step Wet Process of Slurry Coating Plus Induction Heating, the induction coil processing system 10 is used in a first embodiment of an induction firing process, which is the second step in this two-step process embodiment. In this method, the three closely stacked coils 12a, 12b, 12c shown in FIG. 1, which fixed together as a single unit are scanned through the pipe 11 to raise the steel substrate 11a under the bisque up to the firing temperature, typically 750° C. to 850° C. The optimal number of coils depends mainly upon characteristics of the pipe 11, such as the wall thickness, the microstructure and mechanical properties required in the pipe, etc. For example, if the pipe 11 is high strength steel, then it is desirable to use highly localized induction heating, making it possible and practical to quickly heat the steel substrate to the firing temperature of the bisque in a matter of seconds. The flux concentrators 13a, 13b, 13c, made from materials well known to those skilled in the art of induction heating are effective and efficient at focusing the induction heating to the ID area of steel immediately opposite the OD surface of the induction coils 12a, 12b, 12c. Further, if the induction heating is done at a frequency high enough to achieve skin effect, typically above about 10 kHz, then it is practical to avoid heating the full thickness of the steel substrate to the firing temperature which for steel substrates will typically be in the range of 750° C. to 850° C. In fact, the skin effect makes it possible to keep the bulk temperature of the pipe safely below about 725° C. which is the approximate Ac1 transformation temperature of steel. Above the Ac1 temperature, the properties of the steel can be dramatically altered, especially for high strength steels which typically will be Quench and Temper ("Q&T") grade steel or Thermomechanical Controlled Process ("TMCP") grade steel. Therefore, it is desirable to heat only the near surface layer of steel to the firing temperature and minimize the depth of heating as much as possible. Having multiple consecutive induction coils makes it possible to repeatedly heat just the top layer of steel under the bisque to the firing temperature to ensure the bisque is fully transformed into the vitreous state and properly develops the full chemical bond to the steel substrate. For low strength steels, there may not be any metallurgical concerns with heating the full thickness to the firing temperature and therefore these can be fired using lower frequency induction heating. However there still will be commercial and technical advantages to avoid heating the full wall thickness of the steel, for example, minimizing power consumption and physical deformation.

The relative direction of motion can have the pipe 11 going either downward or upward while the internal stinger assembly including the induction coil apparatus 12 remains stationary. Alternatively, the pipe can be held stationary in which case the stinger would be moved downward or upward. Because the bisque is already fully dried, adhering onto the pipe surface, the pipe can be in any orientation, vertical, horizontal or anything in between. Regardless of orientation, the important factor is the relative axial motion of the pipe with respect to the stinger. The pipe 11 may also be rotating while travelling past the induction coils 12a, 12b, 12c, to overcome any circumferential nonuniformities of the induction heating. High frequency electric power to the induction coils 12a, 12b, 12c is conveyed by the pair of water-cooled buss bars 14a, 14b. As the pipe moves along axially while being heated, the heated inner skin of steel of the pipe 11a will have cooled by thermal conduction into the bulk thickness of the steel and/or by forced cooling achieved by cooling fluid being sprayed on the OD surface of the pipe in the cooling zones 15, 16. Flux concentrators 13a, 13b, 13c may be used to confine the magnetic field from the induction coil to just the ID surface of the pipe, thereby preventing stray heating effects of any other parts of the stinger assembly. The flux concentrators also increase the induction heating efficiency by concentrating the induced current into a narrow band.

For thin wall, low strength steel pipe, it may be advantageous to locate the induction coils on the opposite side of pipe wall from the coated surface. Using the arrangement of FIG. 1, the coating bisque would be on the outside surface of the pipe. Conversely if the inside surface of thin wall, low strength steel is being coated, then the induction coils can be located around the outside of the pipe.

As one specific example of representative process conditions for low carbon steel pipe, 250 mm diameter with wall thickness of 3.22 mm, the following parameters were used:
1. Induction power=25 kW;
2. Travel speed range=20 mm/minute up to 115 mm/minute;
3. Corresponding peak temperature=810° C. to 985° C. and
4. Quenching volume range=70 liters/minute to 300 liters/minute.

Example 2: One-Step Dry Process Using Fluidized Beds

Although there are various limitations and disadvantages with the two-step wet slurry process, the two of greatest consequence are:
5. Low temperature processing is necessarily slow to allow for the wet spray application of frit suspended in liquid (typically water) slurry and subsequent controlled drying in order to produce an acceptable, uniform thickness, high quality dried bisque on the steel substrate.
6. High temperature processing of the dried bisque likewise must be slow to allow for vitrification of the dry bisque without entrapping gas bubbles and to allow for hydrogen egress from the underlying steel.

It is possible and practical to eliminate the above disadvantages by using a single step process which works by applying the dry frit powder directly to the hot metal substrate in a controlled, non-oxidizing atmosphere such as argon, nitrogen, carbon dioxide, etc. which will be referred to as inert gas. By using localized induction heating, it is possible and practical to quickly heat the steel substrate to the fusing temperature of the frit in a matter of seconds and achieve high production rates to minimize cost per unit area. If the induction heating is done at a frequency above about 10 kHz, then it is practical to avoid heating the full thickness of the steel substrate to the firing temperature which for steel substrates will typically be in the range of 750° C. to 850° C. At these temperatures, the bulk properties of the steel can be dramatically altered, especially for high strength steels which typically will be Quench and Temper ("Q&T") grade steel or Thermomechanical Controlled Process ("TMCP") grade steel. Therefore, it is desirable to heat only the near surface layer of steel to the firing temperature and minimize the depth of heating as much as possible and even enables self-quenching of the heated surface to restore the yield strength which might otherwise be reduced by heating and slow cooling. For low strength steels, there may not be any metallurgical concerns with heating the full thickness to the firing temperature, however there still will be commercial and technical advantages to avoid heating the full wall thickness of the steel, for example, minimizing power consumption and physical deformation.

Figure 2:
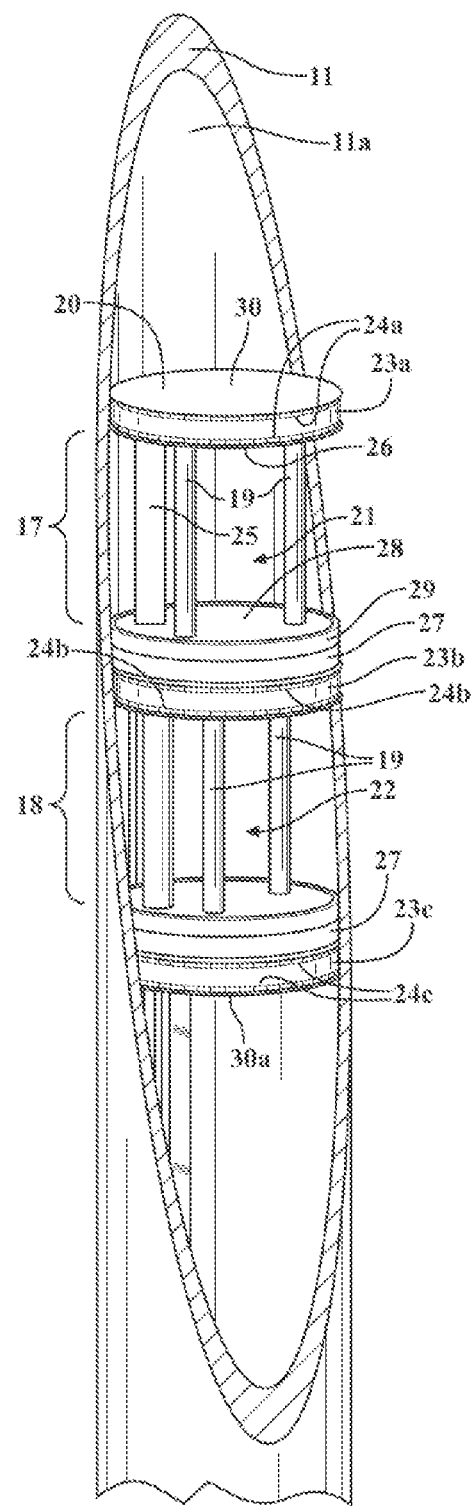
FIG. 2 is a schematic type drawing of a $2^{nd}$ embodiment showing a One-Step Dry Process using simultaneous Fluidized Beds and Induction Firing.

Referring to FIG. 2, in another nonlimiting embodiment of the invention an induction coil enabled coating system with baffles 20 is used in a dry, single-step, fluidized powder process using vertical orientation. In this arrangement, there are two adjacent, stacked fluidizing chambers, including a first chamber 21 and a second chamber 22, both of which are bounded by induction coils 23a, 23b, 23c above and below the fluidized particulate medium (17 and 18) and the relative direction of motion is the pipe 11 moving downward while the internal stinger assembly of the induction coil enabled coating system with baffles 20 remains stationary. For some simple applications, it is sufficient to have a single fluidized chamber with just one coil but in other cases, as for example those involving TMCP steels, it is beneficial to have multiple stacked fluidized chambers with induction coils above and below each chamber to optimally control the temperature cycle which the full wall thickness of steel is subjected to. FIG. 2 is provided to explain this more complex arrangement. The first chamber 21 and second chamber 22 are held in separation by support columns 19. The pipe 11 may also be rotating while travelling downward, to overcome any radial nonuniformities of the induction heating and/or the fluidization. The induction coils 23b, 23c are located immediately below the fluidizing chamber baffle 27 to maximize the duration which the heated steel is in contact with the fluidized particulate medium (17 and 18). High frequency electric power to the induction coils 23a, 24b, 23c is conveyed by a pair of water-cooled buss bars 25. As the pipe 11 moves axially downward with respect to the stinger assembly, while being heated, by the time a given band of heated pipe has reached the upper fluidizing chamber baffle 29, the pipe's heated inner skin 11a will have cooled by conduction into the bulk thickness of the steel down to the point that the thin layer of frit which has fused onto the inside surface of the pipe is below the tack fusing temperature of the given formulation of frit and therefore will not stick to the refractory textile comprising the fluidizing chamber baffles 27 as it slides past. Typically, the tack fusing temperature is several hundred degrees Celsius lower than the firing temperature. Key parameters which govern the thickness of fused coating are:
1. Induction coil width in the axial dimension. Narrow coils 23a, 23b, 23c are shown but they also can be several times wider so as to occupy most of the height of the fluidized particulate medium (17 and 18). Increasing the coil width will increase the duration which the frit particles are exposed to the hot steel surface.
2. Induction frequency and power level which will govern the peak surface temperature and depth of heating in the steel.
3 Axial travel speed of the pipe.
4. Density of the fluidized particulate medium (17 and 18) which in turn is governed by the gas superficial velocity and density, as well as the average particle size and density.

Flux concentrators 24a, 24b, 24c having U-shape may be used to confine the magnetic field from the induction coil to just the ID surface of the pipe, thereby preventing stray heating effects of any other parts of the stinger assembly. They also increase the induction heating efficiency by concentrating the induced current into a narrow band. On the underside of the induction coil 23a is a porous baffle 26 to allow fluidizing gas to escape yet prevent frit from lofting above the induction coil. At the bottom of the upper fluidizing chamber is the fluidizing gas diffuser 28 through which the inert gas is distributed to maintain a uniformly dense volume throughout the fluidized particulate medium (17 and 18). The fluidizing gas support base 29 may contain internal channels to optimize the properties of the particulate medium and also is where the inert gas supply tube is attached. Underneath the fluidizing gas support base 29 is the fluidizing chamber baffle 27 which typically would be a flexible ring of refractory textile such as amorphous silica fiber cloth.

Many variations of the apparatus of FIG. 2 are possible, for example the induction coils could be relocated below both of a topside baffle 30 and the shielding gas baffle 26 so that the induction coil is fully immersed in the fluidized bed zone 17. This is possible because the induction coil does not get hot, only the steel workpiece gets hot and therefore the frit would never fuse onto the induction coil. Neither the frit nor the fluidizing gas are electrically conductive, so there is no risk of short circuiting the induction coil by immersing it in the fluidized bed.

It is well known to those skilled in the art of conventional industrial vitreous coatings, that unless the steel being coated has an extremely low carbon content, it is generally necessary to first apply a ground coat which contains adhesion promoting elements such as nickel and/or cobalt. Over top of this it is normal practice to apply the cover coat which has been formulated for maximum performance in the intended service environment. FIG. 2 illustrates how the ground coat and cover coat can be applied in rapid succession in a single pass process, wherein the upper fluidized particulate medium 17 would contain frit formulated as a ground coat containing adhesion promoters and the lower fluidized particulate medium 18 would contain frit formulated as a cover coat.

Alternatively, if there are no constraints against formulating both coats with adhesion promoters, or if the steel substrate does not mandate their use, then both chambers can have the same frit composition and having two successive chambers provides a convenient method for building up greater total coating thickness. Both chambers operate the same way with all of the comprising elements as described above.

For simplicity, gas supply and return tubes are not are not shown, but both are preferred to enable recycling of the inert gas. They also provide a method by which the flow of frit into the fluidized beds can be balanced and adjusted.

It is also possible to reverse the travel direction of the coating process with a few simple variations to the stinger apparatus shown in FIG. 2, so that the pipe moves upward relative to the stinger assembly. The main difference is that the induction coil for each chamber would be relocated from below to above the fluidizing chamber baffle 27. In this inverted arrangement is it desirable to have a vertical space between the induction coil and the fluidizing gas diffuser 28 to allow room for the fluidized particulate medium (17 and 18) to circulate above and below the induction coil.

Certainly, it is possible to operate the above methods in a non-vertical orientation. However, the further from vertical at which such systems operate, the greater the difficulty of maintaining a fluidized bed, due to the increasing opportunity for fit particles to accumulate on the solid surface of the pipe as the axis of the pipe approaches horizontal orientation. To some extent this accumulation tendency can be offset by rotating the pipe, but in the extreme case of a horizontal pipe, the fluidizing mechanism would be completely ineffective.

Example 3: One-Step Dry Process Using Electrostatic Sprayers

Figure 3:
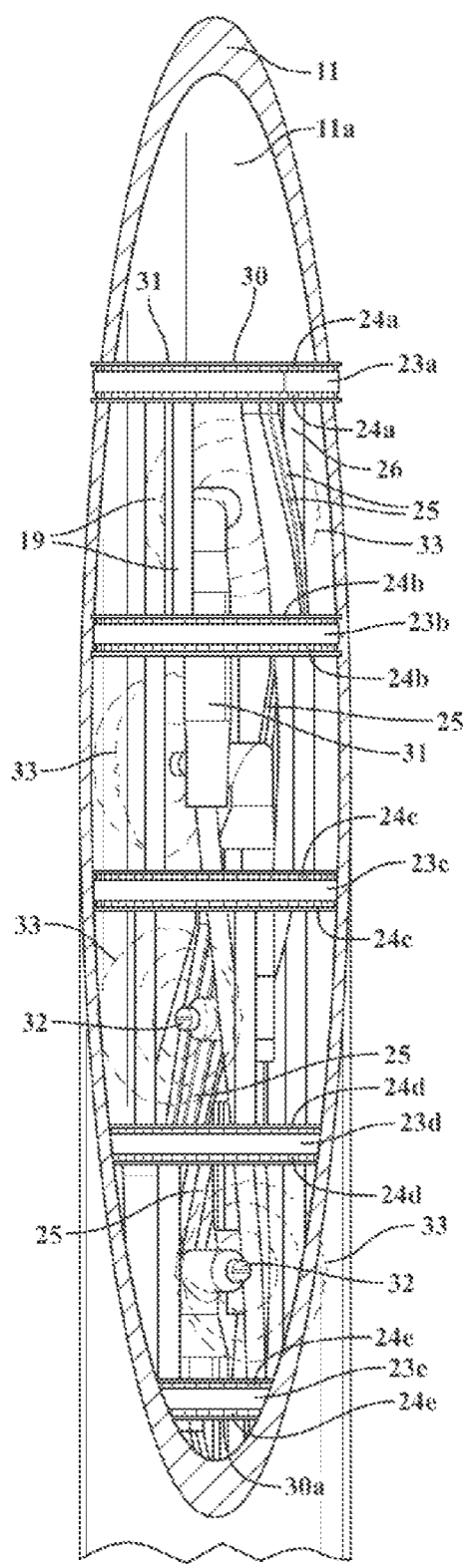
FIG. 3 is a schematic type drawing of a $3^{rd}$ embodiment showing a One-Step Dry Process using simultaneous Electrostatic Sprayers and Induction Firing.

Referring to FIG. 3, in an additional nonlimiting embodiment of the invention an inductive coil enabled coating system with electrostatic sprayers 31 is used for a dry, single-step, electrostatic powder process using vertical orientation. The induction components of the apparatus including baffle 30, induction coils 23a, 23b, 23c, 23d, 23e, flux concentrators (U-shaped) 24a, 24b, 24c, 24d, 24e underside baffle 26, induction buss bars 25 and support columns 19 are similar if not identical to their counterparts in FIG. 2. However, the fluidizing components are all replaced with electrostatic gun components including an electrostatic gun 31 with a tip 32 for spraying a cloud 33 of electrostatically charged frit particles. Together, all of these components comprise key process elements of the stinger assembly for this embodiment.

Unlike the arrangement in FIG. 2 it is possible to operate this electrostatic based embodiment in orientations deviating further from vertical. However, the further from vertical at which such systems operate, the greater the probability for frit particles to accumulate on the solid surface of the pipe as the axis of the pipe approaches horizontal orientation. To some extent this accumulation tendency can be offset by rotating the pipe, but in the extreme case of a horizontal pipe, the fluidizing mechanism would be less effective. Alternatively, this embodiment can include laminar flow suction tubes (not shown) located near the induction coils to collect excess frit particles which otherwise would accumulate on the baffle plates and/or inclined surface of the pipe.

Although it is not clear from the drawing, it is understood that the stinger assembly has a support structure between the induction coils and electrostatic guns and that this structure is externally supported to maintain an operating clearance such that no part of the stinger between the topmost baffle 30 and the lowermost baffle 30a touches the pipe inside surface 11a. This is necessary to ensure that the electrostatically deposited frit particles are not disturbed before the induction heating fuses them to the substrate.

In this embodiment the key parameters which govern the thickness of fused coating are:
1. Voltage differential between the electrostatic particle cloud 33 and the pipe inside surface 11a.
2. Axial travel speed of the pipe.
3. Density of the electrostatic particulate cloud 33 which in turn is governed by the gas density volumetric flow exiting from the spray tips 32 of the electrostatic guns, as well as the average particle size and density.

Example 3a: One-Step Dry Process Using Fluidized Powder Sprayers

This is the simplified version of the embodiment of Example 3 and has a very similar appearance and arrangement of components, except that in this alternative nonlimiting embodiment of the invention the electrostatic guns are replaced with one or more similarly angled tubes which emit a fluidized powder stream(s) onto the heated surface. In this embodiment there is no electrostatic charging of the powder and therefore the deposition efficiency from the nozzle onto the heated surface where it is permanently captured by rapidly melting upon contact is much lower than the efficiency when the particles are electrostatically charged. The portion of the powder which fails to attach to the heated surface is referred to as the "stray powder." As a result of the lower deposition efficiency, it is important to have provisions which prevent the stray powder from accumulating on surfaces of the stinger assembly. One such method is to add suction rings near the perimeter of the topside baffles 30. In all other respects, the system and process for this embodiment closely follows the description provided with Example 3.

Figure 4:
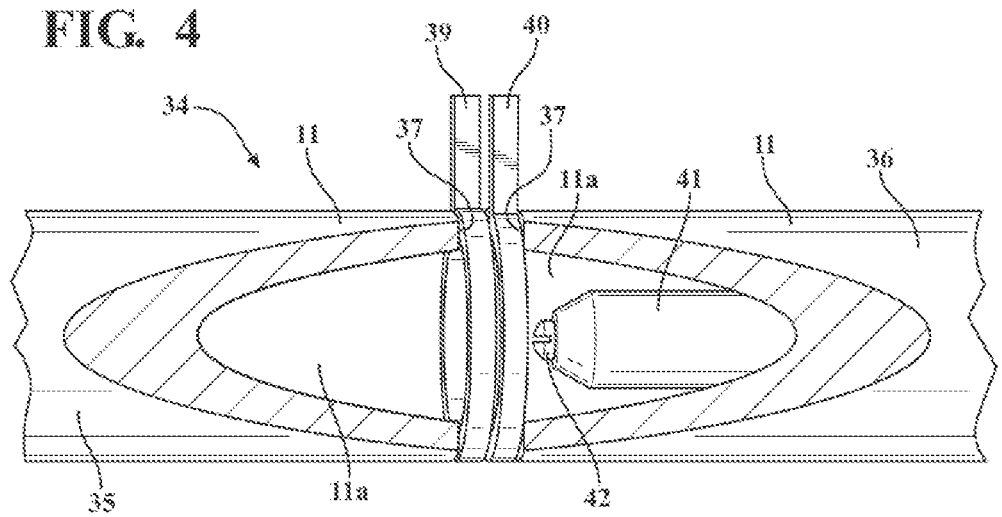
FIG. 4 is a schematic type drawing of a $4^{th}$ embodiment showing a One-Step Dry Process using Electrostatic Sprayers and Induction Kinetic Welding ("IKW") for Small Diameters at the induction heating step.
Figure 4A:
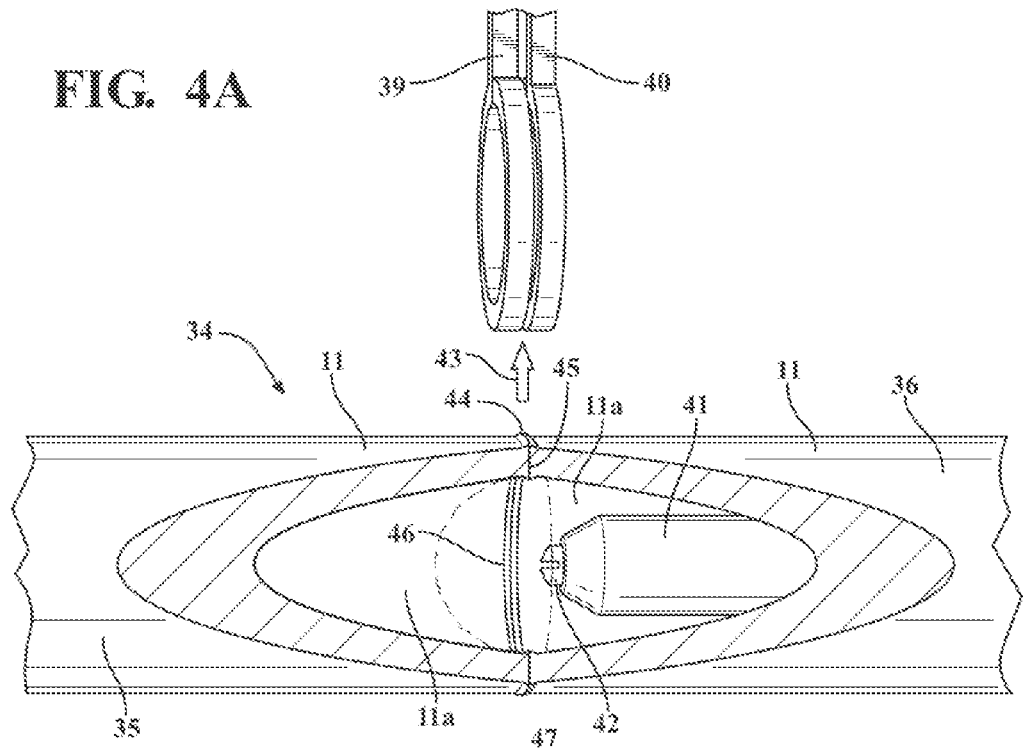
FIG. 4a is a schematic type drawing of the $4^{th}$ embodiment showing the concluding step.

Example 4: Integrated Welding and Coating of Pipes Using Electrostatic Sprayers for Small Diameters Referring to FIG. 4, in another alternative nonlimiting embodiment of the invention a dry, single-step, electrostatic powder coating system 34 and process integrates the welding of a first 35 and second 36 previously coated pipe, while the opposing ends 37 of the two adjacent pipes are butt welded together using the IKW process. This system and method are particularly suitable for, but not limited to small diameter pipes. The previously coated pipes 35, 36 are prepared for welding by machining their opposing endfaces 37 to expose clean steel with no coating on the endface. For the first pipe 35 which will be on the left side of FIG. 4, there would be a temporary gas purge dam (not shown) positioned inside the pipe and several centimeters to the left of a first induction coil 39. The purge dam can for example be a disposable paper dam or re-useable sponge or inflatable plug all of which are known to those skilled in the art of arc-welding of pipelines. The pipes are then gripped in the chucks of an IKW welding machine known to those skilled in the art of IKW and disclosed in other patents. Typically, the IKW machine is equipped with a two-turn induction coil as seen in FIG. 4 having a first turn 39 and a second turn 40 each of which delivers dedicated heating to the adjacent pipe endface. From the distal end of the second pipe 36 on the right side of the second induction coil 40, a long stinger equipped with a single electrostatic gun assembly 41 is inserted until its spray tip 42 comes within a few centimeters of the second pipe 36 end adjacent to the second induction coil 40. It is necessary to set the axial position of the gun 41 (or guns in an alternative embodiment) with a clearance of about a centimeter from the nearside plane of the induction coil. This is primarily to create a safe clearance between the gun tip 42 and the second coil 40 so that, with added reference to FIG. 4a, when the coil rapidly moves in the direction 43 out from between the pipe ends to the position as seen in FIG. 4a there is no risk of crashing. Once in this configuration, the purge gas for the IKW welding process starts flowing from several ports, not shown but already known to those skilled in the art. The purge typically requires about one minute to achieve the controlled oxygen-free atmosphere required for the IKW process and at this point the first 39 and second 40 induction coils are energized to begin the heating phase of the IKW process. Duration of the heating phase typically ranges from as little as about 5 seconds to as long as about 20 seconds and the purge gas flow must continue during this heating. When the two opposed pipe endfaces 37 reach the prescribed hot forging temperature of the IKW process, the induction coils are rapidly ejected in the direction 43 from between the pipe ends 37 and the pipe ends are rapidly brought into contact with each other. At the moment of contact, one of the pipes is rotated to commence the kinetic phase of the IKW process which creates viscoplastic heating of the weld zone and typically has a duration of 1 to 2 seconds. For the IKW process to be able to produce a good quality weld 44, it is imperative that no frit contaminates the endface interface 45 and therefore the flow of frit in the form of a spay cloud 49 from the electrostatic nozzle 42 must not begin until after the pipe ends begin to coalesce into a weld which typically is about one-quarter to one-half way through the kinetic phase. At this time, it is optimal to begin the flow of frit onto the hot weld zone since the remaining duration of viscoplastic heating is very beneficial to the formation of a strong bond between the coating and the metal substrate. Since the IKW weld 44 reaches a peak temperature of about 1300° C. during the kinetic phase which is well above the minimum temperature required for firing the frit, there is a period of several seconds after completion of the kinetic phase during which additional frit can be fused onto the surface of the weld zone 46. Unless there is an additional source of heat supplied, such as an internally positioned induction coil (not shown), the time window during which the frit can be applied and properly fused begins with the partway through the kinetic phase and ends once the weld zone 46 drops below about 800° C., typically less than 10 seconds total duration. Besides the duration of the kinetic phase, this total time window is also controlled by the induction heat input to the weld.

A key benefit of electrostatic deposition of the frit is that it tends to preferentially deposit coating onto any areas which are bare or only thinly coated. It is inherently self-regulating in the applied thickness, which in turn is primarily controlled by the magnitude of the voltage differential between the electrostatic particle cloud and the adjacent surface of the weld zone 46.

One of the limitations of this configuration is that the electrostatic particle cloud has a finite effective radius from the spray tip 42 which may be as little as 50 mm depending on such factors as the required deposition rate, gas flow velocity in the confined area, etc. Therefore, larger diameters make it necessary to position the electrostatic gun eccentrically inside the pipe.

Figure 5:
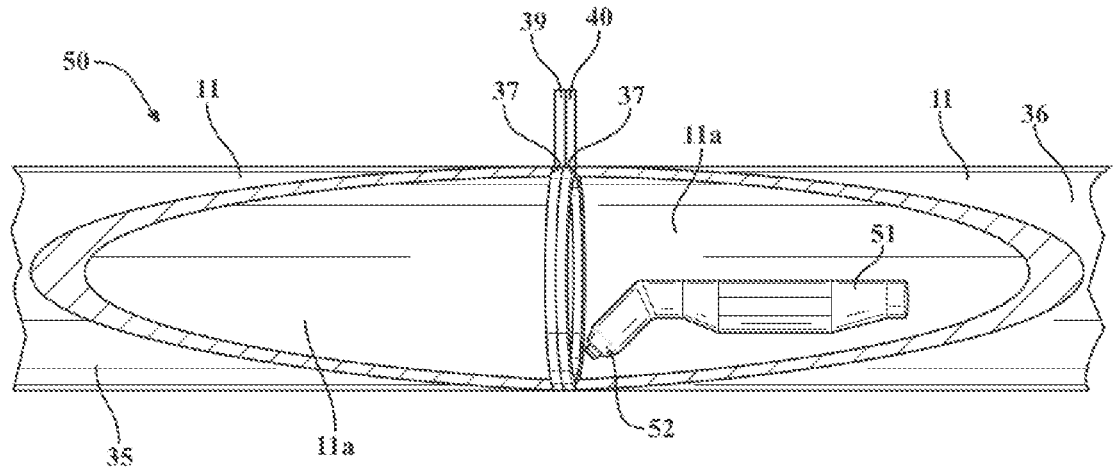
FIG. 5 is a schematic type drawing of a $5^{th}$ embodiment showing a One-Step Dry Process using Electrostatic Sprayers and Induction Kinetic Welding ("IKW") for Large Diameters.
Figure 5A:
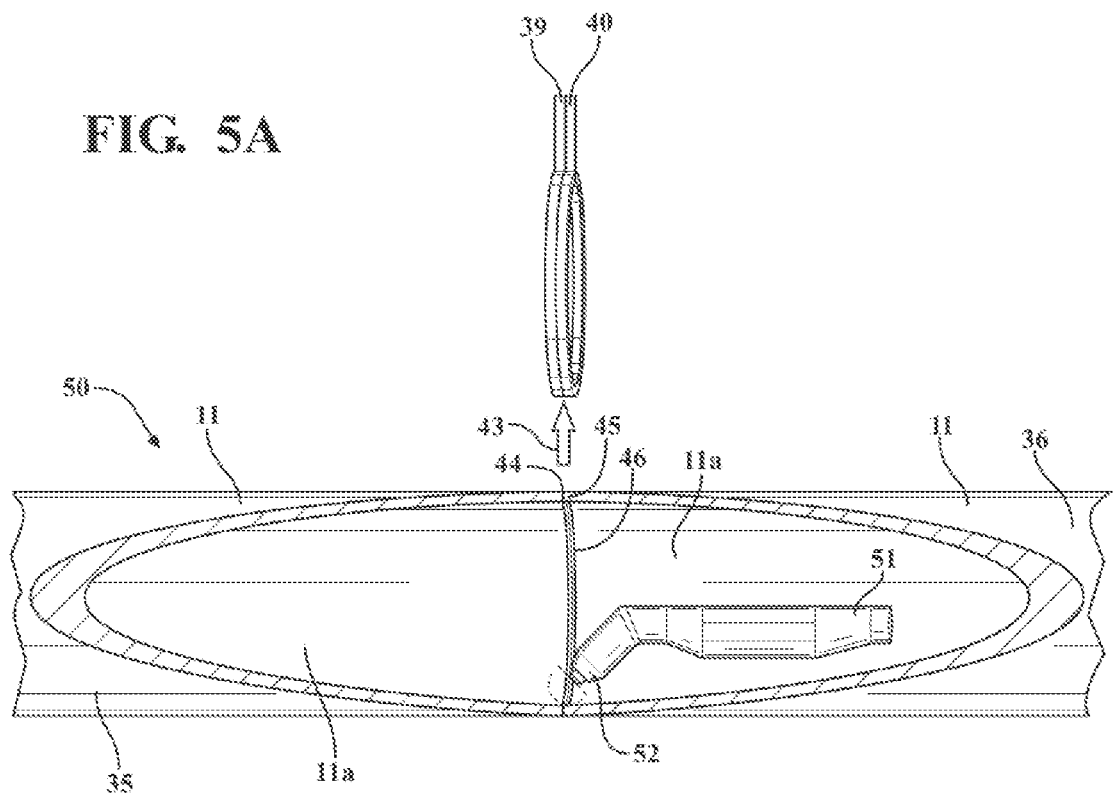
FIG. 5a is a schematic type drawing of the $5^{th}$ embodiment showing the concluding step.

Example 5: Integrated Welding and Coating of Pipes Using Electrostatic Sprayers for Large Diameters With reference to FIG. 5, in another nonlimiting embodiment of the invention a dry, single-step, electrostatic powder coating system 50 is used when larger diameters of pre-coated pipe need to be welded. This embodiment substantially matches the embodiment in reference to Example 4, except in this embodiment, it is preferable to use one or more electrostatic guns 51 which are eccentrically positioned as illustrated in FIG. 5 and equipped with an angled head 52 to direct the powder flow at an angle away from the pipe axis, for example 45 degrees as illustrated. Clearly this arrangement makes it necessary to revolve the gun(s) 51 with respect to the pipe to ensure uniform distribution of the frit onto the hot surface. As explained in Example 4, there is only a brief time window during which the frit must be applied to the weld zone as it is being completed in the IKW process. Therefore, as the pipe diameter is increased, it is advisable to proportionately increase the number of electrostatic guns since there is a practical limit to the mass flow rate which commercially available electrostatic guns are capable of achieving. FIG. 5 only shows a single gun 51 but it is understood that additional guns can be fitted at equidistant intervals in a circular array, aiming toward the sections of the circumference away from the section already covered by the single gun illustrated. In all other respects, the process for this example closely follows the description provided with Example 4.

Example 5a: Integrated Welding and Coating of Pipes Using Fluidized Powder Sprayers This alternative nonlimiting embodiment of the invention is a simplified version of Example 5 and has a very similar appearance and arrangement of components, except that the electrostatic guns are replaced with one or more similarly angled tubes which emit a fluidized powder stream(s) onto the heated surface. In this embodiment there is no electrostatic charging of the powder and therefore the deposition efficiency from the nozzle onto the heated surface where it is permanently captured by rapidly melting upon contact is much lower than the efficiency when the particles are electrostatically charged. The portion of the powder which fails to attach to the heated surface is referred to as the "stray powder." As a result of the lower deposition efficiency, and the fact that most applications where precoated pipes are being butt welded together will be in horizontal or nearly horizontal orientation, it is important to have provisions which prevent the stray powder from accumulating on the bottom of the pipe on the weld 46 or near the weld. One such method is to ensure there is sufficient velocity to the fluidized powder stream to blow stray powder off of the heated weld zone. This is because in most application associated with this example, it will not be possible to rotate the pipe, nor to orient it on a vertical axis. In all other respects, the process for this example closely follows the description provided with Example 5.

Example 6: Electrostatic Powder Spot Repair Gun for Pipe ID

It is to be expected that in any operation where large quantities of pipe are internally coated by any of the preceding examples, there will be a small percentage which have defects, which would be discovered by visual inspection or nondestructive testing ("NDT") methods such as spark testing, film thickness measurement, and others methods known to those skilled in the art of nondestructive evaluation ("NDE") of coatings. The defects can be expected to range from single pinpoint holidays, to small bare patches, occasionally to massive defective areas. For the latter, it generally is most cost effective to remove the coating by abrasive blasting and simply reprocess the pipe. But for small defects in which there is a deficiency of coating, it is both possible and sensible to perform a localized, spot repair. This is possible because similar to thermomelting plastics, vitreous coatings can be remelted and overcoated, with full bond strength being achieved between the prior coating and the newly added coating.

Figure 6:
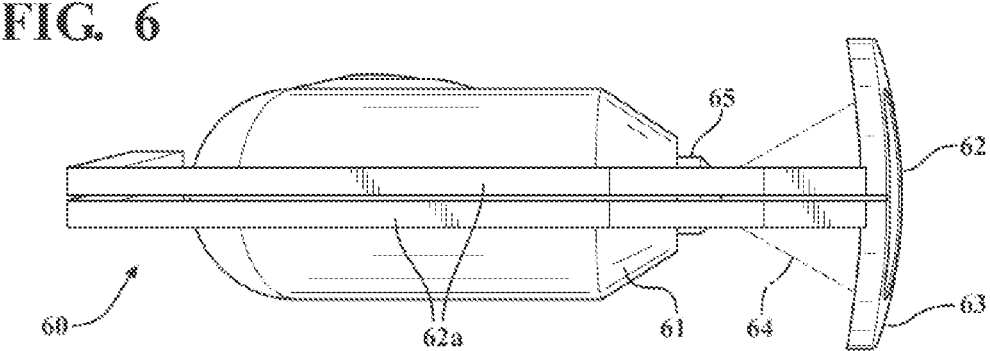
FIG. 6 is a schematic type drawing of a $6^{th}$ embodiment showing the top view of a new tool for Localized and/or spot repair of coating on the ID of pipes.
Figure 6A:
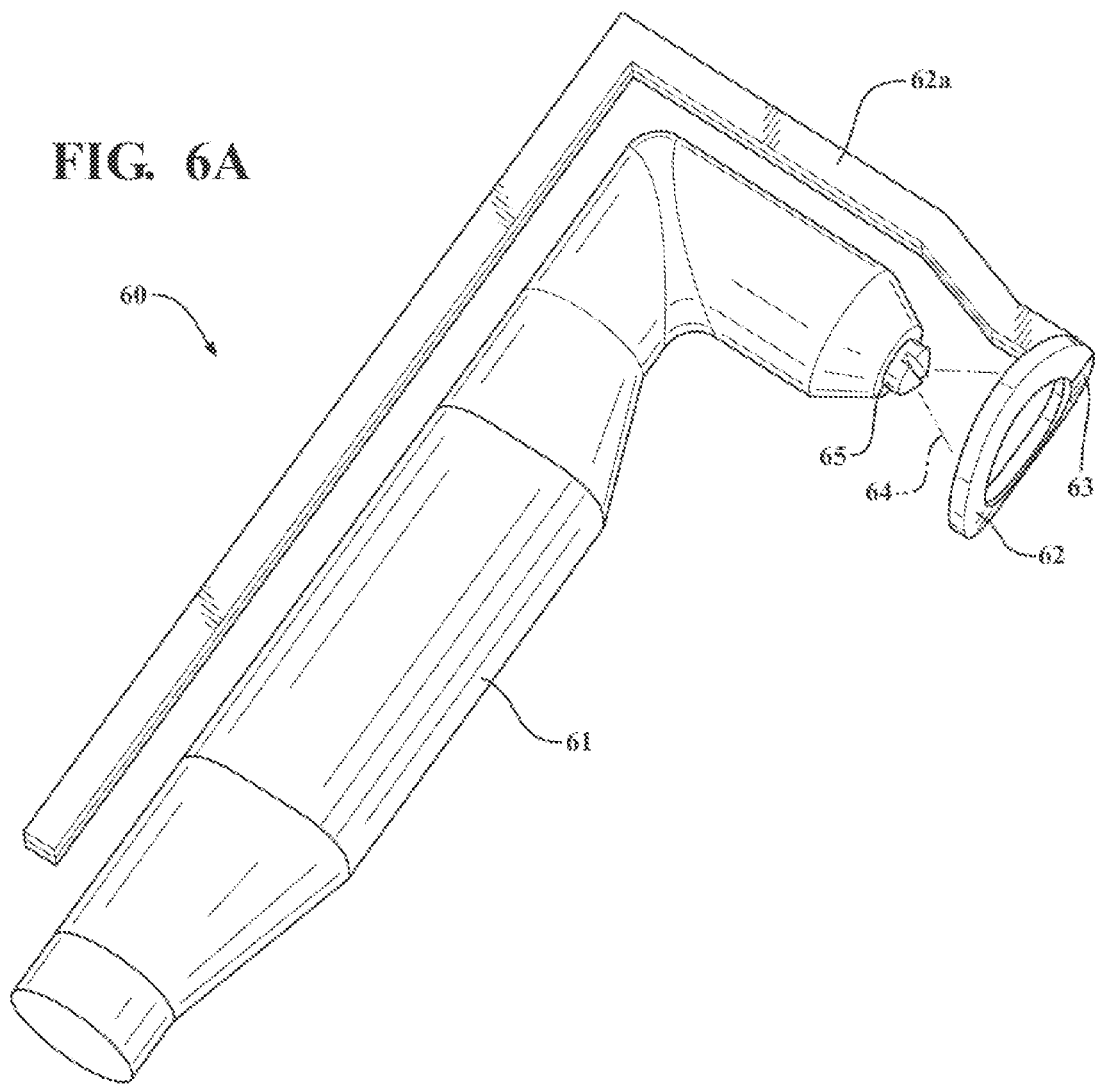
FIG. 6a is a schematic type drawing of the $6^{th}$ embodiment showing the side view.

Referring to FIG. 6, in a nonlimiting embodiment of the invention an electrostatic gun repair apparatus 60, and method includes a spot repair gun 61 which incorporates a small induction coil 62, including a water cooled buss bar 62a with a standard electrostatic gun assembly. The induction coil 62 would have a curved heating face 63, roughly approximating the ID curvature of the pipe to be repaired. The whole assembly could be manipulated by hand, or by a multi-axis robot. Operating principle is essentially similar to Example 3. The induction coil 62 efficiently heats the metal substrate of the pipe up to the firing temperature and once a given small area has reached that temperature, the electrostatic gun 61 would be turned on, creating a frit cloud 64 from the spray tip 65 depositing the frit onto the bare or deficient area.

Example 7: Electrostatic Powder Spot Repair Gun for Flat Plates and Pipe OD

Figure 7:
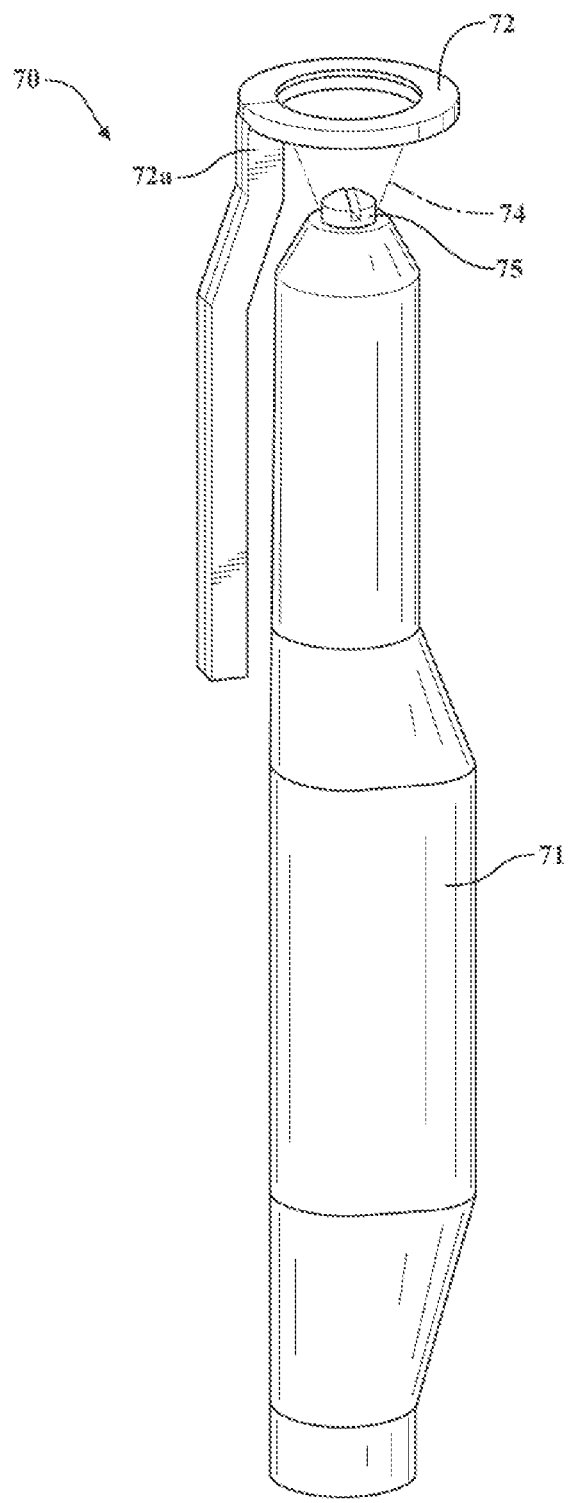
FIG. 7 is a schematic type drawing of a $7^{th}$ embodiment showing a new tool for Localized and/or spot repair of coating on the OD of pipes or on flat plates.

For a pipe which has been externally coated and either has small defects or has butt welds which need to be coated, a repair system is needed. Referring to FIG. 7, in a nonlimiting embodiment of the invention an electrostatic gun repair apparatus 70, and method includes a spot repair gun 71 with a standard electrostatic gun assembly which incorporates a small induction coil 72, including a water cooled buss bar 72a. An electrostatic gun tip 74 emits a spray cloud 75 of frit. As with Example 6, this gun and coil could be manipulated by hand or by multi-axis robot. In yet another product application, this gun and coil could be used to coat the weld seams of large storage tanks, again either being manipulated by hand or by multi-axis robot. In all other respects, the process for this example closely follows the description provided with Example 6.

Example 8: Internal Coating, Fluidized Bed Embodiment Viewing Underside of Stinger When there are asymmetric features within the fluidized chambers shown in FIG. 8, such as induction buss bars 14a,b,c, or flow restrictions like the thin annular gap 100 between the induction coil and the adjacent pipe wall being coated, it is beneficial to mechanically enhance the circulation of the fluidized frit. In this example, circulation is augmented by the impeller 101 in each chamber, each driven by a small dedicated low speed motor 102.

Figure 8:
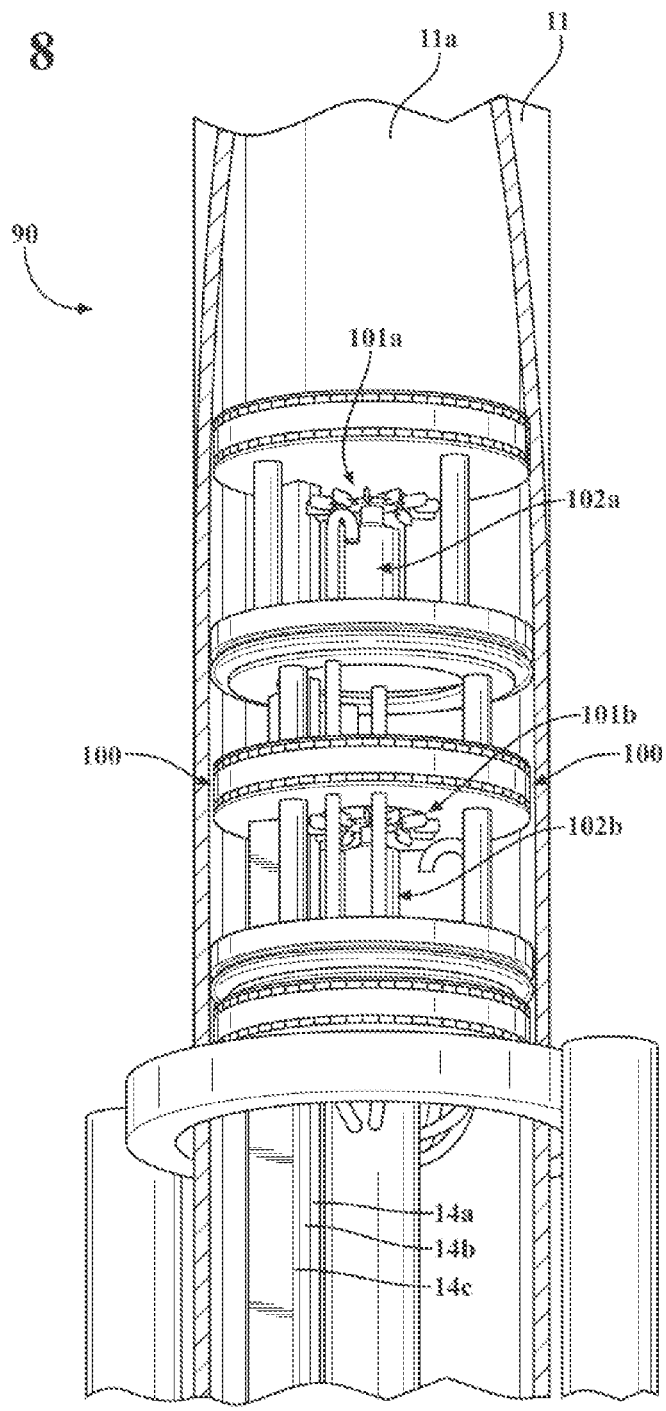
FIG. 8 is a schematic type drawing of an 8$^{th}$ embodiment showing a method for synchronizing the internal coating system of FIG. 2 with external quenching, as viewed from underneath to see the impellers which circulate and homogenize the fluidized frit bath.
Figure 9:
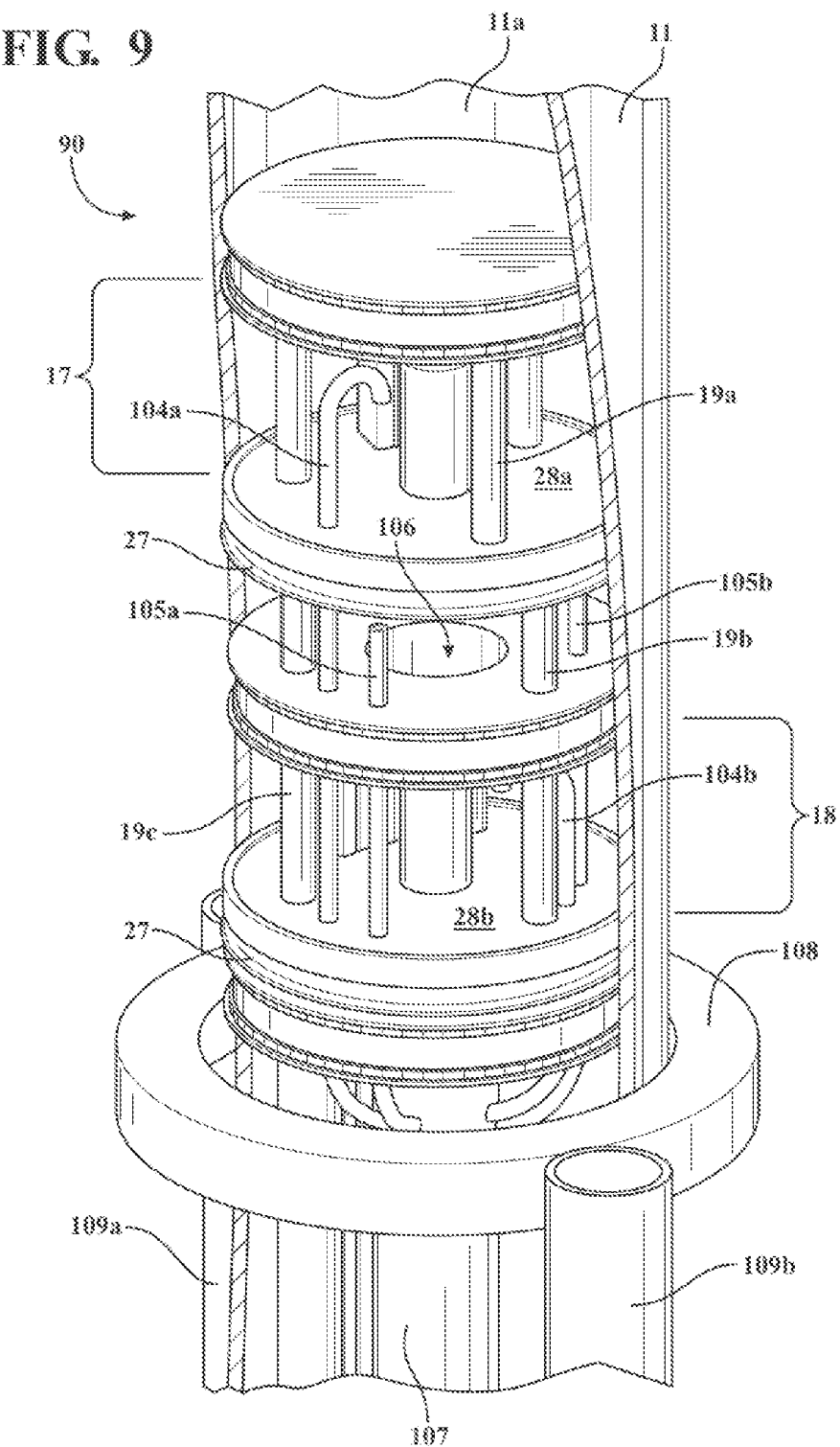
FIG. 9 is a schematic type drawing of the 8$^{th}$ embodiment showing a method for synchronizing the internal coating system of FIG. 2 with external quenching, as viewed from above to see gas and frit infeed, exhaust and overflow tubes, as well as the porous baffle plates which create the fluidization.

Example 9: Internal Coating, Fluidized Bed Embodiment Viewing Topside of Stinger FIG. 9 is the identical embodiment as shown in FIG. 8, but viewed from above to better see other features. By using medium or high frequency induction, it is very practical to avoid through thickness heating of the pipe wall and confine the highest temperatures of the frit fusing process to the near surface zone of the pipe wall. This is only possible when the induction coil is heating on the same side as that which is being coated, which is otherwise referred to as "front surface heating". In turn, this presents the opportunity to implement quenching on the opposite side of the pipe wall which is depicted in FIG. 8 with the external quenching achieved by quench ring 108. Outside of the view of FIG. 8 are additional frame structures which maintain the axial position of the Quench ring on the outside in relation to the Stinger assembly on the inside of the pipe. Compared to the simplified representation of a Stinger assembly in FIG. 2, there are several internal features more fully detailed in FIG. 9, such as the Infeed tubes for the Frit 104, the Exhaust tubes 105 for excess Frit powder and Fluidizing gas, as well as the central Return hole 106 for frit circulation. Similarly on the outside of the pipe being coated, there is an example of how the external quenching can be accomplished with a single Quench ring 108 located on support columns 109 which are approximately the same height as the internal Column 107 which supports the Stinger assembly. It is understood that additional quench rings could be stacked above 108 but roughly centered between each adjacent pair of induction coils, an arrangement which would be capable of more closely limiting the peak temperature which the bulk thickness of the pipe wall is subjected to. This is important for preserving the carefully engineered properties of high grade metal such as TMCP steel. Another feature shown is the centered Return hole 106 for improved toroidal circulation of the fluidized frit.

Example 10: External Coating, Fluidized Bed Embodiment Cross Section of Stinger

Figure 10:
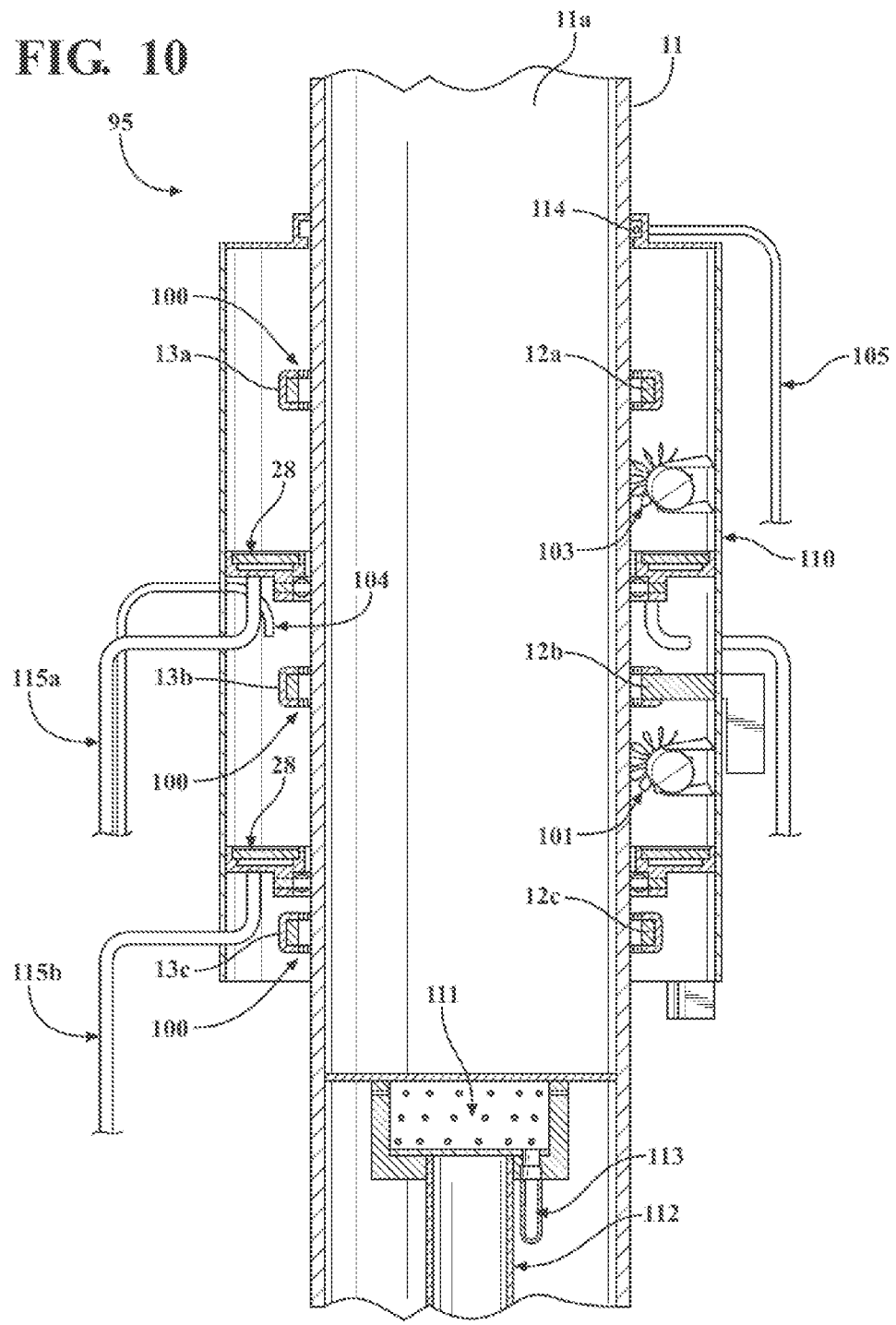
FIG. 10 is a schematic type drawing of a 9$^{th}$ embodiment showing the method for inverting the process to coat the outside of the pipe, with internal quenching, but using the similar vertical arrangement of one or more fluidizing baffle plates with induction coils positioned above and below.

When using front surface induction heating at medium or high frequency, it is conceptually very simple to invert the design of the equipment to coat the exterior surface of the pipe using the identical process. FIG. 10 provides a simple 2-chamber embodiment which works the same way as the internal stinger in FIG. 8 and FIG. 9. The chief difference is that the fluidized bed has the shape of an annular ring instead of a short cylinder and because of this it is advisable to use multiple peripheral impellers 101 or 103 with horizontal shafts instead of the centralized vertical shaft orientation shown in FIG. 8. The induction coils and flux concentrators are nearly identical to those in FIG. 8 except that the flux concentrators are facing inward instead of outward. It is also necessary to provide perimeter containment 110 for the fluidized bed since the pipe being coated does not provide containment. Now the opposite side quenching is delivered to the inside of the pipe by a centralized diffuser 111 which is supported on a column 112 which also provides a conduit for the quenchant. Similar to FIG. 108, it is understood that additional quench diffusers could be stacked above 111 to precisely limit the peak temperature of the pipe's bulk wall thickness. Whenever impellers are used to force circulation of the fluidized bed, it is a simple but powerful improvement to connect an electrostatic voltage source and slightly modify the tips of the impeller blades. This is detailed as 103 where the blade tips are sharpened to a point to promote corona discharge which makes them very effective at electrostatically charging the frit particles suspended in the fluidized bed. With this imposed electrostatic charge, the frit particles will preferentially migrate toward and adhere onto any bare metallic surface which is electrically grounded, therefore with this improvement it is necessary to coat all other metal components in the fluidized chamber with a dielectric coating having a dielectric strength safely greater than the applied electrostatic voltage. Once these conditions are met, then the only place for the charged frit particles to attach are wherever there is bare steel pipe surface immersed in the fluidized bed.

Example 11: External Coating, Fluidized Bed Embodiment—Process Sequence

Figure 11A:
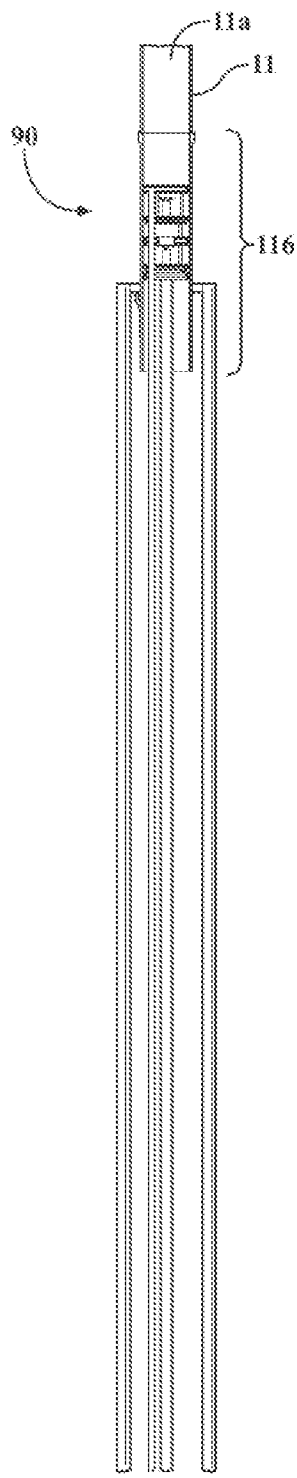
FIG. 11 is a schematic type drawing of a 10$^{th}$ embodiment showing progression of the internal coating process with external quenching and extension pipes on the both ends of the pipe being coated to enable coating and fusing fully to both ends of the pipe. The progression of the process is depicted in three steps, each comprised of a pair of overview/magnified view drawings identified as 11a&b, 11c&d and 11e&f.
Figure 11B:
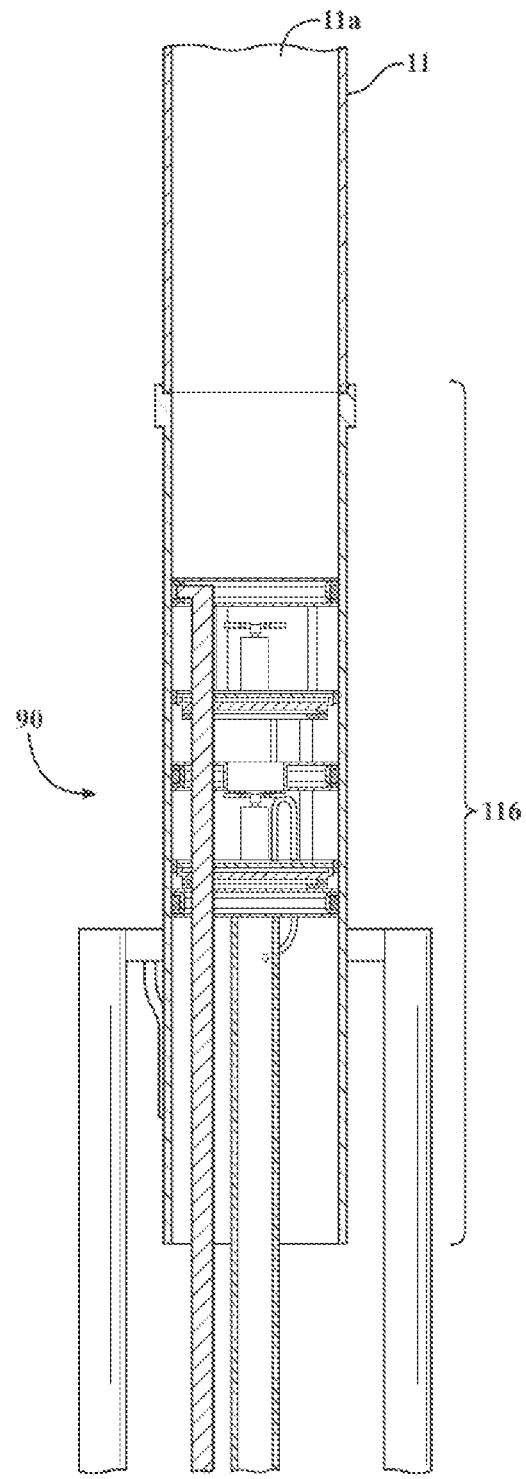
Figure 11C:
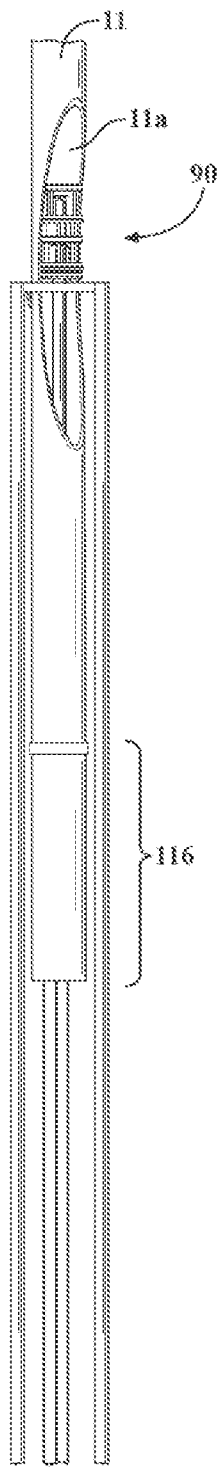
Figure 11D:
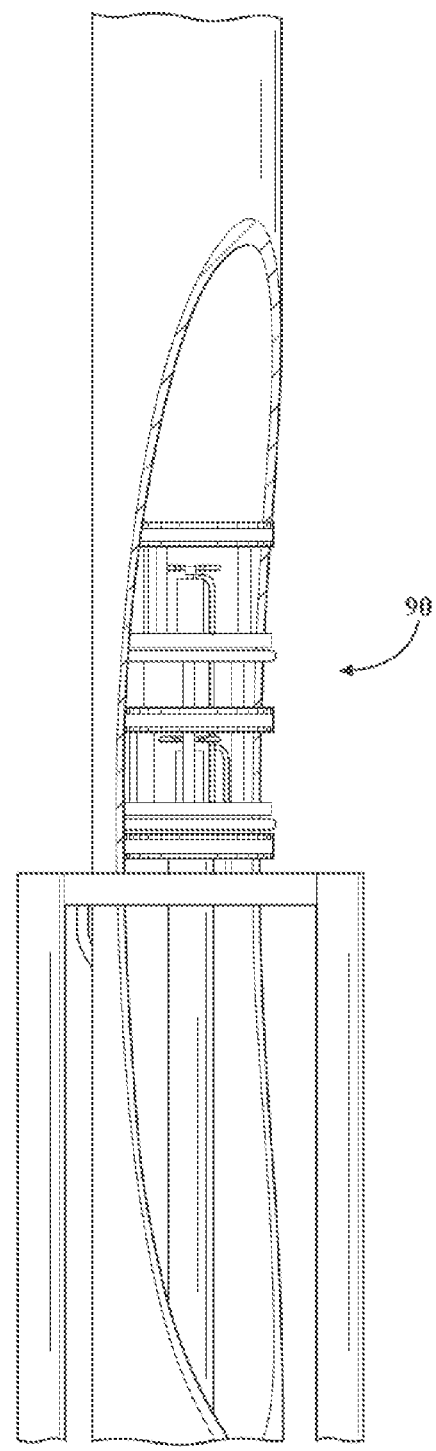
Figures 11E, 11F:
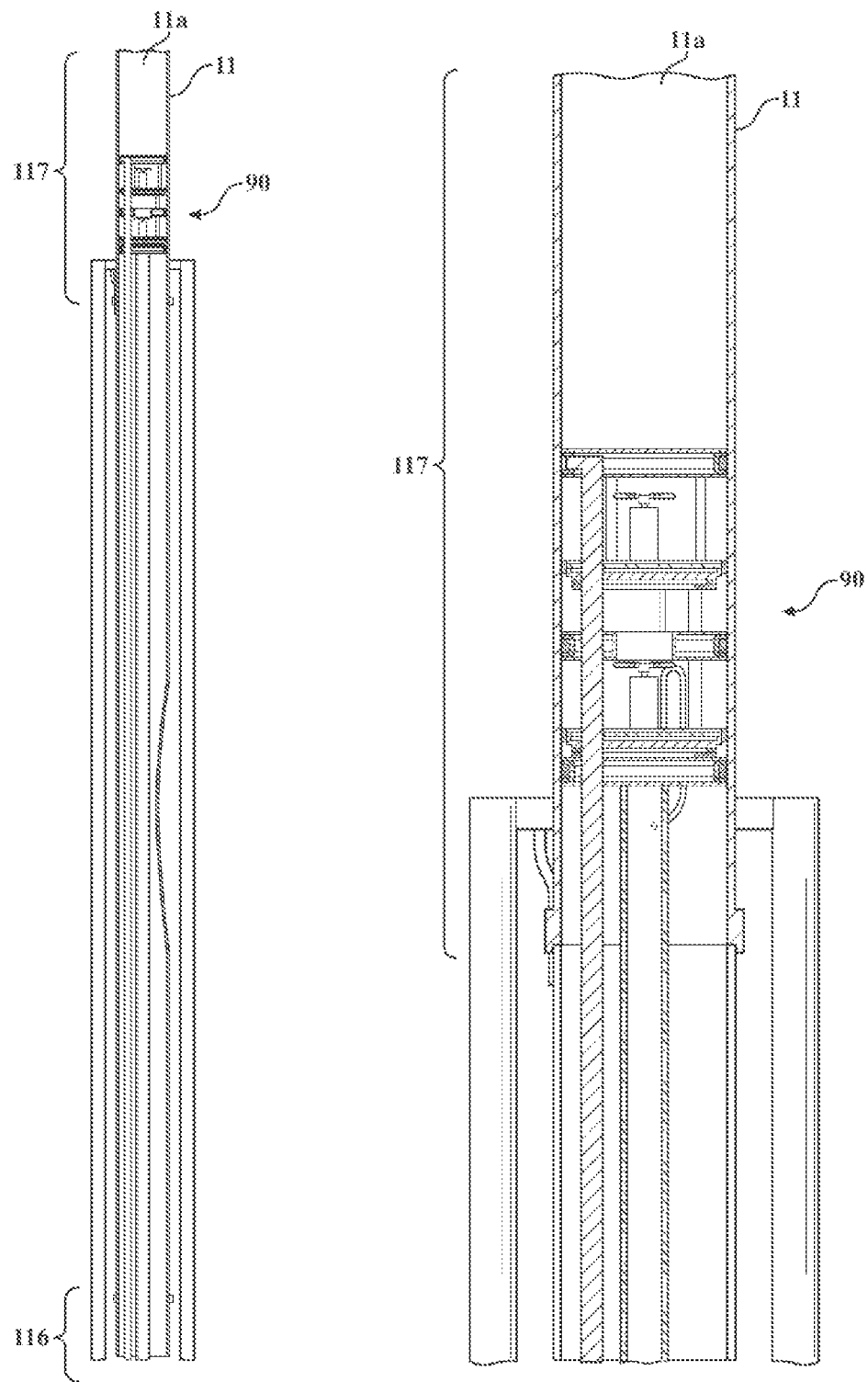

FIGS. 11*a, b, c, d, e, f* are a progressive schematic series of the same Stinger embodiment described in Examples 8 and 9, as the Stinger makes its way from start to finish through the pipe being coated in three main steps. Each of the three steps is depicted as a pair of schematics, the first being an overview image and the second being a magnified cutaway view of the pipe, revealing the stinger inside. Step #1 (FIG. 11*a* & FIG. 11*b*) has the Stinger parked completely inside of Entry pipe 116 to provide a place for all process subsystems to be initialized and stabilized before the stinger is elevated into the bottom end of the pipe being coated. This sequence is fully described in the Flowchart, FIG. 13. Once all process subsystems are stable at their nominal settings, Step 2 can begin when the stinger enters the pipe being coated, depicted being at the midpoint position in FIG. 11*c* and FIG. 11*d*. Step 2 represents the steady state condition of operation, hence process parameters would remain fixed and constant regardless of the length of the pipe. Steady state parameter settings would be held until the stinger is fully inside of the Exit pipe 117. It is important to have steady state conditions before the stinger enters the pipe and remain so until after the stinger has exited the pipe in order to achieve full coating integrity for the entire length of the pipe, with minimal end effects. It is expected that perhaps a few centimeters of pipe length would be cut off and discarded from each end to ensure end-to-end coating integrity. For coating of the OD of pipe, an identical sequence would be followed using an embodiment such as presented in Example 10, similarly with short tubular extensions temporarily attached to both ends of the pipe being coated.

FIG. 12: Flowchart for Two-Step Wet Process of Slurry Coating & Induction Fusing This is a much slower and more costly process than the present invention and is presented to provide a relevant baseline for comparison. It starts with 300, Frit powder being dry blended to match the specified service conditions of the given application. Then the dry frit is Dry Frit blended with distilled water to make Slurry suspension. While the slurry is being prepared, the metal pipe to be coated 310 is degreased & grit blasted to near white cleanliness. Typically an internal lance with a spray head used to spray the slurry inside the full length of the pipe 315, but it is also possible to dip coat or flood coat the slurry into the prepared pipe. Before induction fusing is possible, all water must be driven out of the slurry coating 320 which normally is done over a period of several hours in a drying oven operating between 40 C and 90 C. This step converts the moist slurry coating into a dry hard bisque. After drying, the entire pipe must be inspected, particularly for blisters, but also for any chips, holidays or other visible defects in the bisque 325. If significant defects are found, the pipe is returned to the blast cleaning step 310. If it passes inspection, the pipe is loaded into the Induction Fusing machine 330. Parameters adjusted to the frit formulation and steel properties are input to the Induction fusing machine 335. Depending on the grade and type of steel being coated, it may be necessary to have exterior quenching of the pipe following closely after the induction coil in which case the quench ring is set up, for example on the OD of the pipe if the pipe is being internally coated, 345. Otherwise if quenching is not required then step 345 is skipped and the induction heating and scanning can begin, 350. An automatic controller receiving realtime temperature feedback adjusts the induction power and/or travel speed of the coil along the pipe axis to maintain a constant optimal time at temperature, 355 over the full length of the pipe. Once the entire pipe length of the pipe has been fused 360, the induction and quench flow are shut off. The completed pipe is then unloaded from the Induction firing machine 365.

Figure 13:
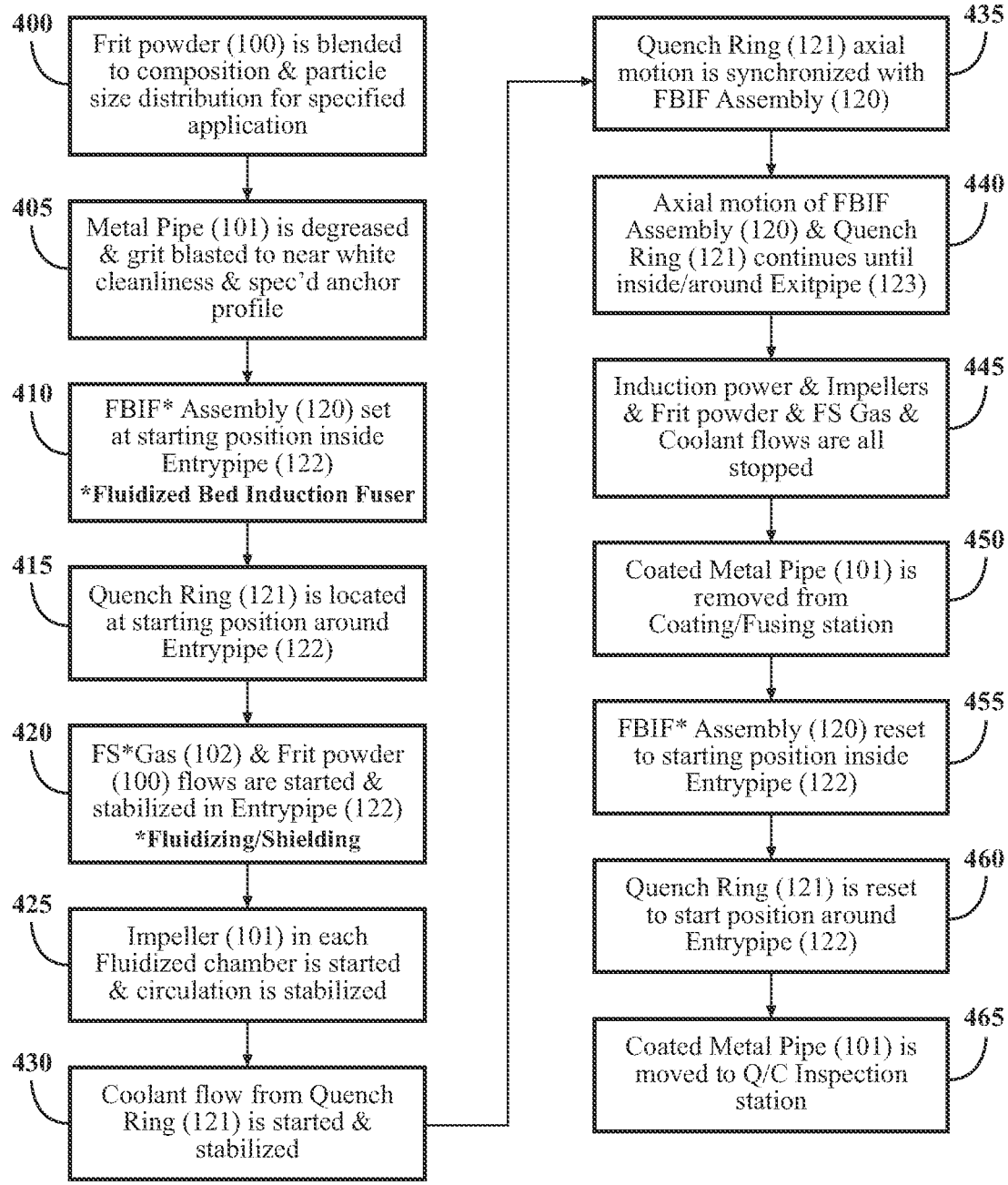
FIG. 13 is a flowchart type drawing showing a One-Step Dry process of Fluidized Beds concurrent with Induction Fusing.

FIG. 13: Flowchart for One-Step Dry Process of Fluidized Beds+Induction Fusing In contrast to the foregoing two-step process, the present invention completely eliminates the slow, trouble prone preparatory step of wet coating and then drying the pipe. Instead, the entire process is condensed into a single integrated, fast operation. It still must start with dry preparation of the frit powder 400, formulated for the requirements of the intended service conditions. Likewise the pipe is prepared for coating in the same way 405 as the two step process. Step 410 is where the difference becomes obvious, because the stinger has dual functions; a) to quickly and briefly heat a narrow ring shaped band of the bare steel surface up to the fusing temperature (typically about 850 C) and while at the same time dispensing a constant quantity of dry frit powder onto the hot surface where it instantly melts and flows into a continuous film. Since it will take several dozen centimeters of axial travel for these two processes to stabilize, it is beneficial to use a short recyclable stub of Entrypipe abutting the pipe to be coated to ensure they have reached steady state before the stinger enters the pipe being coated. These are described as sequential steps 410 parking the stinger inside the stub pipe, 415 parking the quench ring around the inside of the Entrypipe. Then the cold process of starting the fluidized frit bed 420 is stabilized followed closely by startup of the Impeller 425 and the coolant flow from the Quench ring, 430. Once all of these have stabilized the axial motion with induction heating can begin, 435, still all inside of the Entrypipe. In a steady state condition, the Stinger assembly and Quench ring traverse along the pipe axis, 440 all the way past the distal end of the pipe and into the Exitpipe at which point all process systems are stopped, 445. The fully coated and fused pipe is detached from the Entrypipe and Exitpipe and moved beyond the Coating/Fusion station. The whole process is prepared to repeat by moving the Stinger back into the Entrypipe 455 and the Quench ring around the Entrypipe, 460. During the foregoing 2 steps the coated & fused pipe is allowed to finish cooling to a safe handling temperature before being moved to the Q/C Inspection station, 465.

Figure 14:
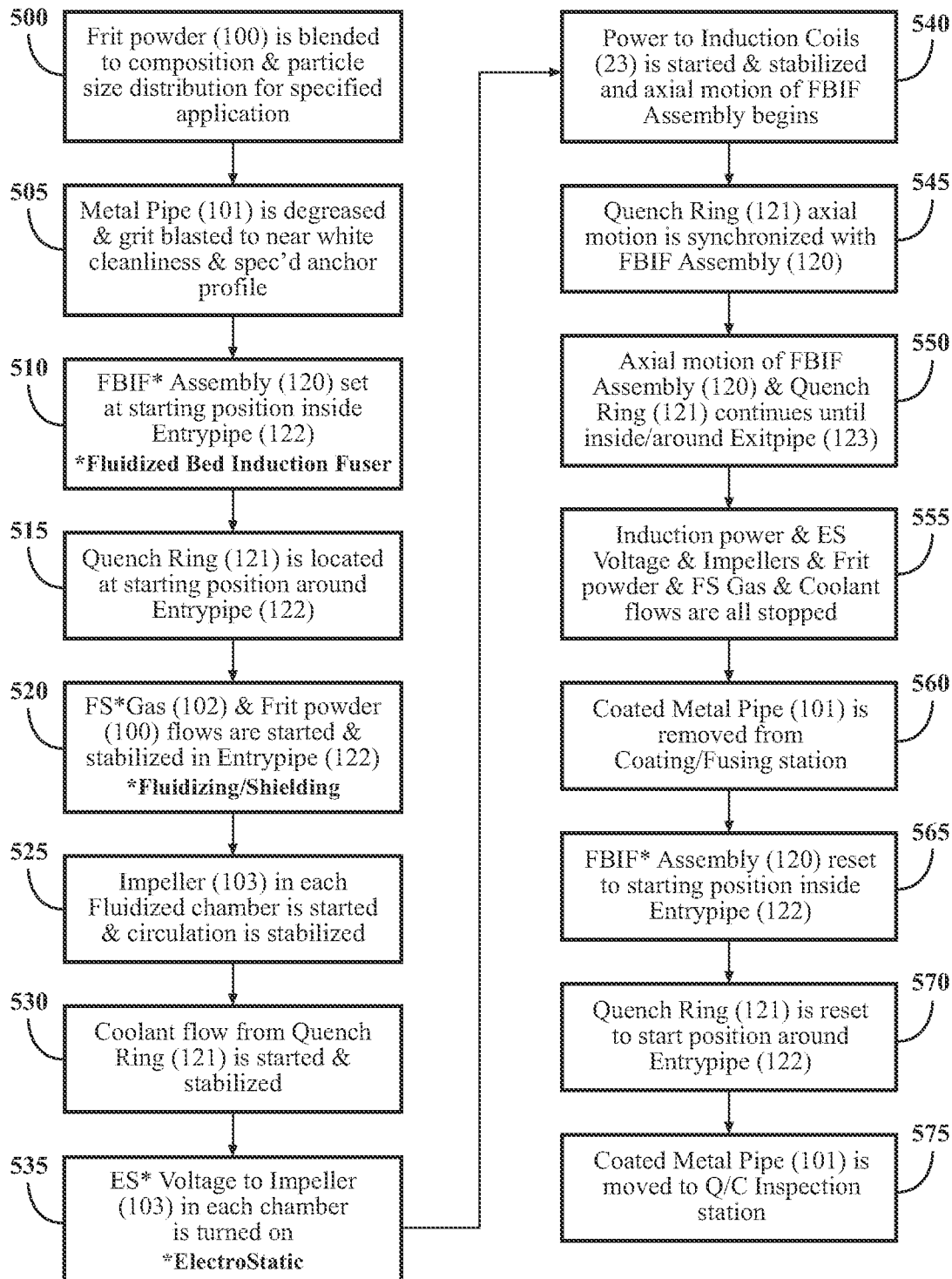
FIG. 14 is a flowchart type drawing showing a One-Step Dry process of Electrostatic Charging combined with Fluidized Beds, concurrent with Induction Fusing.

FIG. 14: Flowchart for One-Step Dry Process of E.S. Charged & Fluidized Beds+Induction Fusing Referring to FIG. 14, in a nonlimiting embodiment of the process of the invention a one-step dry process with an electrostatic fluidized bed and induction fusing includes the following steps: First, the frit powder 100 is blended to appropriate composition and particle size distribution for the specified application 500. Next, a metal pipe 101 is degreased and grit blasted to near white cleanliness and specified anchor profile 505. A Fluidized Bed Induction Fuser ("FBIF") assembly 120 is set at a starting position inside the entrypipe 122, at step 510. The quench ring 121 is located at starting position around the Entrypipe 122, at step 515. A fluidizing shielding gas 102 and frit powder 100 flows are started and stabilized in the Entrypipe 122, at step 520. Next, the impeller 103 in each fluidized chamber is started and circulation is stabilized 525. A coolant flow from the quench ring 121 is started and stabilized 530. Next, the electrostatic voltage to the impeller 103 in each chamber is turned on 535. The power to Induction coils 23 is started and stabilized and axial motion of the FBIF assembly begins 540. The quench ring's 121 axial motion is synchronized with the FBIF Assembly 120, at step 545. The axial motion of the FBIF Assembly 120 and the quench ring 121 continues until inside/around Exitpipe 123, at step 550. The induction power and the electrostatic voltage, impellers, frit powder, fluidizing/shielding gas, and coolant flows are all stopped 555. Next, the coated metal pipe 101 is removed from the coating/fusing station 560. The FBIF assembly 120 is reset to starting position inside Entrypipe 122, at step 560. The quench ring 121 is reset to a start position around the Entrypipe 122 at step 570. Lastly, the coated metal pipe 101 is moved to a quality control inspection station for inspection 575.

Figure 15:
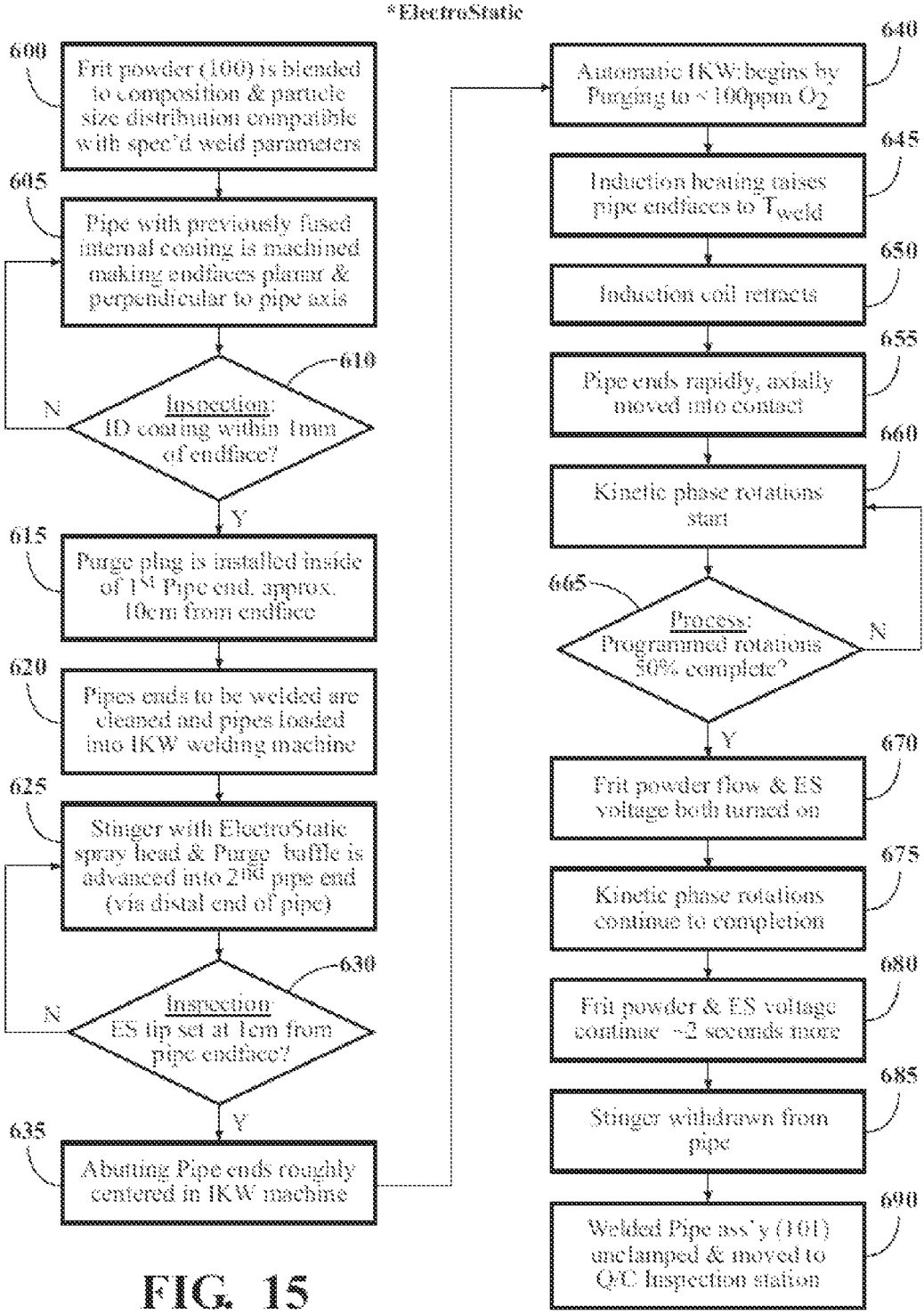
FIG. 15 is a flowchart type drawing showing the process of Integrated Welding and concurrently Coating of the weld using an Electrostatic Sprayer.

FIG. 15: Flowchart for Integrated Welding & Coating of Small Diameter Pipes Using ES* Sprayer Referring to FIG. 15, in a nonlimiting embodiment of the process of the invention an integrated welding and coating process of small diameter pipes using an electrostatic sprayer includes the following steps: First, the frit powder 100 is blended to composition and particle size distribution compatible with specified weld parameters 600. Next, a pipe with previously fused internal coating is machined making endfaces planar and perpendicular to the pipe axis 605. Next, the ID coating within 1 mm of the endface is inspected 610. Next, a purge plug is installed inside of the first pipe end, approximately 10 cm from the endface 615. Next, the pipes' ends to be welded are cleaned and the pipes are loaded into the IKW welding machine 620. Next, the stinger with an electrostatic spray head and purge baffle is advanced into second pipe end (via the distal end of pipe) 625. Next, the electrostatic tip is inspected and set at 1 cm from the pipe endfaces 630. Next, the abutting pipe ends are roughly centered in the IKW machine 635. The automatic IKW process begins by purging the <100 ppm $O_2$ 640. The induction heating raises the pipe endfaces to the welding temperature (Tweld) 645. Next, the induction coil retracts 650 and the pipe ends rapidly and axially move into contact 655. The kinetic phase rotations start 660. This is programmed determine whether it is at 50% completion 665. At about 50% completion the frit power flows, and the electrostatic sprayer voltage is turned on 670. The kinetic phase rotations continue to completion 675. Next, the frit powder and the electrostatic spraying continue for ~2 seconds more 680. After completion, the stringer is withdrawn from the pipe 685 and the welded pipe assembly 101 is unclamped and moved to a quality control inspection station 690.

Therefore, the invention provides an improved set of nonlimiting embodiments for providing a vitreous coating on pipes including both the inside and outside of the pipes. Integration with an IKW process allows for a real-time processing of the pipes together including welding and coating the weld area in the field of operation such as the environment of an oilwell. Other applications are also available. In all applications the invention provides improvements in efficiency and quality of applying a vitreous coating on the inside and/or outside of the pipes. Importantly, the benefits include heating and creating a vitreous coating without changing the metallurgical properties of the metal pipes being treated with the improved apparatuses and methods.

What is claimed is:

1. A method of applying a vitreous coating to a metal pipe by a dry process using induction heating and electrostatic sprayers, the method comprising:
    advancing an induction heating apparatus along an interior surface of a metal pipe, wherein the induction heating apparatus comprises at least one ring-shaped induction coil, a first baffle and second baffle, wherein the first baffle and second baffle at least partially and circumferentially seal off a portion of the interior surface of the metal pipe in proximity to the at least one ring-shaped induction coil, wherein an enclosed processing area is proximate to the at least one ring-shaped induction coil, wherein the enclosed processing area includes at least one electrostatic sprayer;
    energizing the at least one ring-shaped induction coil to controllably heat the interior surface of the metal pipe in proximity to the enclosed processing area;
    energizing the least one electrostatic sprayer and electrostatically spraying a dry frit onto the interior surface of the metal pipe; and
    forming a vitreous coating on the interior surface of the metal pipe from the dry frit by fusing the dry frit onto the interior surface of the metal pipe as the induction heating apparatus advances along the interior surface of the metal pipe.

2. The method of claim 1, wherein at least one of the first baffle and the second baffle are porous to gases.

3. The method of claim 1, wherein at least one of the first baffle and the second baffle is associated with a fabric seal circumferentially contacting the interior surface of the pipe.

4. The method of claim 1, further comprising:
    quenching the metal pipe with a ring-shaped quench head, wherein the quench head cooperatively advances along the exterior of the metal pipe as the induction heating apparatus advances along the interior surface of the metal pipe.

* * * * *